(12) United States Patent
Zeh et al.

(10) Patent No.: US 12,413,414 B2
(45) Date of Patent: Sep. 9, 2025

(54) SECURE COMMUNICATIONS USING PRE-SHARED KEYS AND LIVE MEMBERSHIP

(71) Applicant: Infineon Technologies AG, Neubiberg (DE)

(72) Inventors: Alexander Zeh, Munich (DE); Kenneth William Tindell, Bury St. Edmunds (GB)

(73) Assignee: Infineon Technologies AG, Neubiberg (DE)

( * ) Notice: Subject to any disclaimer, the term of this patent is extended or adjusted under 35 U.S.C. 154(b) by 159 days.

(21) Appl. No.: 18/401,044

(22) Filed: Dec. 29, 2023

(65) Prior Publication Data

US 2025/0219841 A1    Jul. 3, 2025

(51) Int. Cl.
*H04L 9/32* (2006.01)
*H04L 9/08* (2006.01)
(Continued)

(52) U.S. Cl.
CPC .......... *H04L 9/3242* (2013.01); *H04L 9/0861* (2013.01); *H04L 12/40104* (2013.01);
(Continued)

(58) Field of Classification Search
None
See application file for complete search history.

(56) References Cited

U.S. PATENT DOCUMENTS 9,483,533 B2 * 11/2016 Chen .................. G06F 16/2477
10,419,930 B2 * 9/2019 Holland .............. H04W 12/069
(Continued)

FOREIGN PATENT DOCUMENTS

CN    108028753 A  *  5/2018  ............... H04L 9/12
CN    113132098 B     8/2022
(Continued)

OTHER PUBLICATIONS

Xuhang Ying, Giuseppe Bernieri, Mauro Conti, Linda Bushnell, and Radha Poovendran (Covert Channel-Based Transmitter Authentication in Controller Area Networks); pp. 15; IEEE Publication Date: Mar. 23, (Year: 2021).*

(Continued)

*Primary Examiner* — Ali H. Cheema

(74) *Attorney, Agent, or Firm* — Banner & Witcoff Ltd.

(57) ABSTRACT

The described techniques address issues to achieve key agreement without the need to exchange separate key agreement messages and, consequently, meets the stringent starting time requirements for real-time control systems. This is achieved using a group-wide key counter, with each node storing the latest value of this counter that was observed via the last received secured message. This counter value increases monotonically, and nodes maintain synchronization by transmitting this counter value (or a representation of the counter value) in each secured message. The use of key counters may be extended to guard against weak replay attacks via the implementation of a live membership tracking solution, which defines one or more membership groups. Each node within a membership group may request, or "challenge" other nodes with the same membership group at any time to verify their online status, and this online status may be maintained over time.

35 Claims, 15 Drawing Sheets

(51) Int. Cl.
    *H04L 12/40*     (2006.01)
    *H04L 9/40*     (2022.01)

(52) U.S. Cl.
    CPC ...... *H04L 9/0819* (2013.01); *H04L 12/40006* (2013.01); *H04L 63/062* (2013.01); *H04L 2209/84* (2013.01)

(56) References Cited

U.S. PATENT DOCUMENTS

| | | | | |
|---|---|---|---|---|
| 2013/0290585 | A1* | 10/2013 | Marietta | G06F 13/14 710/240 |
| 2016/0119894 | A1* | 4/2016 | Patil | H04W 8/005 455/515 |
| 2016/0174225 | A1* | 6/2016 | Patil | H04W 40/246 370/329 |
| 2018/0109445 | A1* | 4/2018 | Yan | H04L 45/28 |
| 2022/0046602 | A1* | 2/2022 | Hosseini | H04W 72/56 |

FOREIGN PATENT DOCUMENTS

| | | | | |
|---|---|---|---|---|
| EP | 4080813 | A1 | 10/2022 | |
| KR | 20190132068 | A * | 11/2019 | G05B 23/0213 |

OTHER PUBLICATIONS

Hsiao-Ying Lin, Zhuo Wei, Yanjiang Yang, Yadong Wei, Kang Tang, and Qingdi Sha (AnchorCAN: Anchor-based Secure CAN Communications System); pp. 7; Date Added to IEEE Xplore: Jan. 24, (Year: 2019).*

Xuhang Ying, et al.: "Covert Channel-Based Transmitter Authentication in Controller Area Networks", IEEE Transactions on Dependable and Secure Computing, vol. xx, No. xx, Aug. 12, 2019.

Hsiao-Ying Lin, et al, "AnchorCAN: Anchor-based Secure CAN Communications System", IEEE Conference on Dependable and Secure Computing (DSC), Oct. 12, 2018.

Apr. 14, 2025—(PCT) International Search Report and Written Opinion; International Application No. PCT/EP2024/088290.

Dworkin, M., "Recommendation for Block Cipher Modes of Operation: Galois/Counter Mode (GCM) and GMAC", NIST National Institute of Standards and Technology, NIST Special Publication 800-38D, Nov. 2007.

FIPS 197, Federal Information Processing Standards Publication, "Advanced Encryption Standard (AES)", Information Technology Laboratory National Institute of Standards and Technology, Nov. 26, 2001.

* cited by examiner

SECURE COMMUNICATIONS USING PRE-SHARED KEYS AND LIVE MEMBERSHIP

TECHNICAL FIELD

The disclosure generally relates to the use of secure data communications and, more particularly, to the use of secure communications that leverage locally stored key counter values in accordance with a real-time bus key distribution system to eliminate the need for dedicated key agreement messages, as well as the use of live membership groups to provide an additional layer of security by adding data to scheduled secured messages that are transmitted among nodes within membership groups without the use of dedicated secured messages for this purpose.

BACKGROUND

Controller Area Network (CAN), Controller Area Network Flexible Data-Rate (CAN FD), Controller Area Network Extra Long (CAN XL), and Ethernet communication protocols are currently the dominant network/protocols implemented for use in automotive in-vehicle communications, which leverage an accompanying electrical/electronic (E/E) architecture. However, these conventional approaches have various drawbacks, particularly with respect to the communication overhead needed to distribute shared keys that are used to authenticate, encrypt, and decrypt secured messages within the network.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Figure 1A:
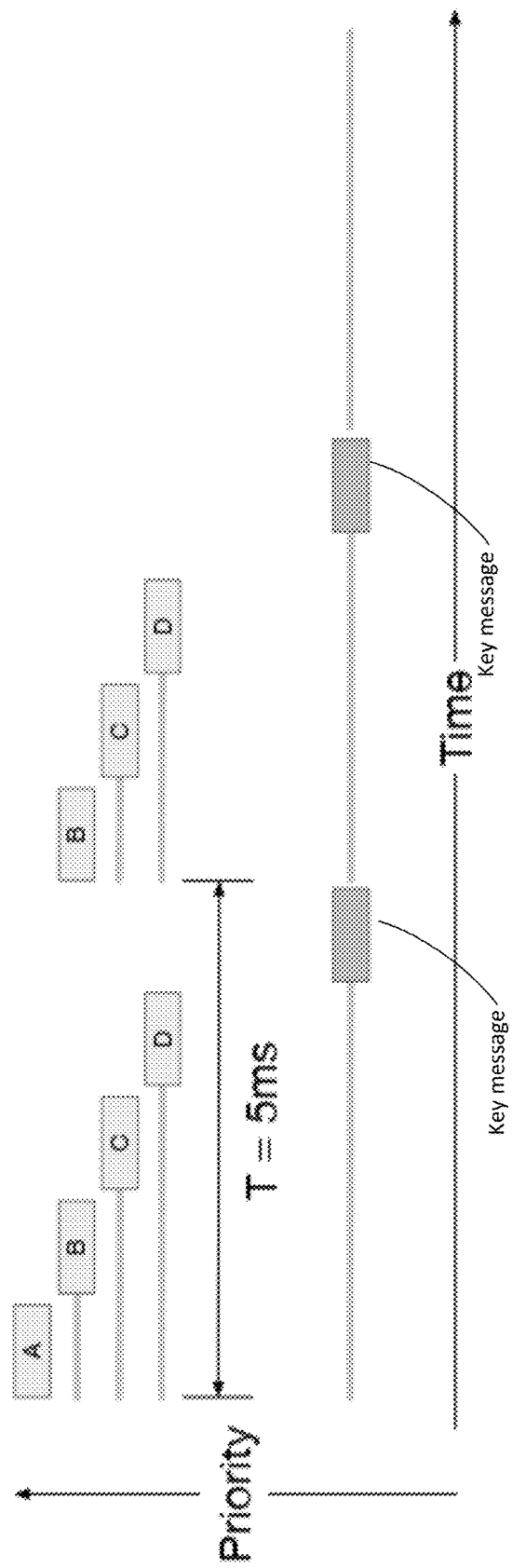
FIG. 1A illustrates the use of a conventional key agreement messaging protocol for low priority frames.

Again, conventional communication protocols and electrical/electronic (E/E) architectures have various drawbacks, particularly with respect to the processing power, overhead, and time required to generate the shared keys needed to ensure authentic and secure communications across the network. For instance, a typical E/E architecture used to communicate secured messages as further discussed herein may comprise a system of interconnected "nodes," which may represent any suitable type of device within a network that is configured to transmit and receive secure messages, such as sensors, electronic control units, actuators, electromechanical components, etc. The number of interconnected nodes in such systems may be on the order of tens or hundreds, and each node may transmit secured messages to and receive secured messages from other nodes within the interconnected system.

The underlying network supporting the system of interconnected nodes may be implemented as part of any suitable type of system that utilizes secured communications, such as for example an in-vehicle network, industrial-based networks such as those used in production lines, etc. For example, an interconnected system of nodes may comprise groups of nodes that communicate securely via a connected broadcast bus to facilitate a real-time control system. Such a real-time control system may utilize the communication of sensor data, control data, or other data, and may comprise components that, in the event of a failure, may represent a significant safety risk. Thus, specific operating parameters need to be considered to ensure robust secure communications within such systems.

For instance, any of the nodes in such a real-time control system may reset at any time (e.g. if an internal watchdog timer is triggered), and all data in the node's volatile memory (RAM) is lost as a result. Moreover, after a node starts (or restarts), the node must be able to resume communications very quickly, i.e. within a few milliseconds, to receive and send messages (e.g., sensor data, actuator commands, etc.) to and from other nodes on the bus. Furthermore, messages must be protected against tampering by an attacker, and potentially must also be encrypted to prevent an attacker from seeing the contents of the message. A node should also be protected against replay attacks (i.e., where an attacker takes a copy of a message sent on the bus and then transmits it again later to attempt to cause receiving nodes to act upon it). Additionally, the cryptographic systems for secure messaging must change keys when they become "exhausted" (i.e., have been used too often), and each group of nodes engaged in secure communications need to agree on the same values of a replacement key.

To this end, it is noted that secured messages are generated by a node prior to transmission via the use of one or more shared keys, which may also be referred to as shared secrets or secret keys, and generally do not change over the lifetime of the nodes. The shared keys are typically stored in the local memory of each node and provided as an input to a cryptographic block, which implements a cryptographic function such as a key derivation function (KDF). The cryptographic block also receives an input in the form of a counter value, which may change over time, as well as any other suitable inputs that are used to ensure a uniqueness of keys generated in this manner. The cryptographic block may thus output, for each set of inputs which includes at least the shared key and a counter value, one or more session keys, which may be used for the authentication and/or encryption of the secured messages. Thus, when symmetric encryption is implemented, the node(s) receiving the secured message utilizes the same session key(s) as the node that transmitted the secured message.

However, the shared keys and the session keys should not be transmitted unencrypted (i.e., in the clear) as doing so poses a significant security risk by exposing the pre-shared keys to potential attackers. Thus, to prevent the transmission of keys in the clear, conventional communication protocols and E/E architectures utilize a system referred to as key agreement. This process ensures that the nodes involved in secure communications agree to use the same session key (by means of a key agreement protocol) and, when the key is exhausted or otherwise needs to be updated, the nodes agree on a new session key. Thus, for a node that has restarted and forgotten all details of previous keys, the node cannot replay messages using an old session key.

Thus, a monotonically increasing sequence number is typically used to prevent replaying messages where the key has not changed, which may alternatively be referred to as a freshness value (FV). This is accomplished via the current Ethernet standard MKA (MACsec Key Agreement) protocol. However, this introduces issues when implemented as part of secure, real-time control systems. Specifically, the protocol takes too long to complete, and a node that has restarted has to wait far too long for a consensus to be established on a new session key before the node can once again receive and send secure messages (i.e., a large number of messages must be exchanged between a group of nodes and a central key server).

Figure 1B:
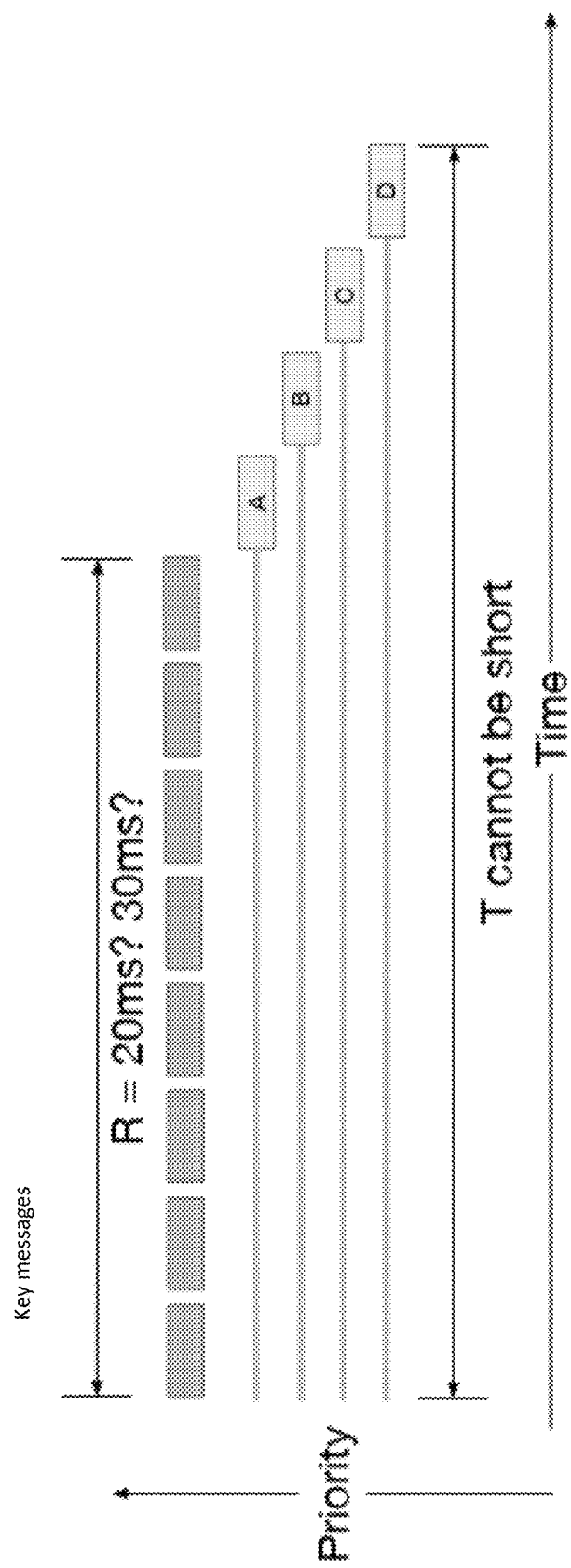
FIG. 1B illustrates the use of a conventional key agreement messaging protocol for high priority frames.

For instance, and turning now to FIGS. 1A and 1B, blocks A, B, C, and D represent high priority frames in accordance with a key agreement communication protocol, such as MACsec for example. Upon a disruption in communications, e.g., when a node is reset, the key messages need to be transmitted from each node to other nodes in the system to ensure a synchronization among all nodes in a group. Thus, the blocks at the bottom of FIG. 1A represent the key distribution messages when the secure messages are a lower priority. In this case, it is shown that secure communications cannot occur between the nodes B, C, and D until a new key message is distributed to each of the nodes B, C, and D. This adds latency to the secured communications and is thus undesirable for the communication of lower priority secured messages. This also introduces an issue for higher priority communications, as shown in FIG. 1B. Specifically, FIG. 1B illustrates the introduction of latency as a result of the need to distribute the key messages to each of the communicating nodes A, B, C, and D. Thus, conventional key agreement protocols are not suitable for nodes connected on a broadcast bus for use in real-time control systems, as such latency may introduce significant safety risks.

The embodiments as further described herein are directed to addressing this issue by achieving key agreement without the need to exchange separate key agreement messages and, consequently, meets the stringent starting time requirements for real-time control systems. This is achieved, as discussed in further detail below, using a group-wide key counter, with each node storing in its non-volatile memory the latest value of this counter that was observed via the last received secured message. This counter value increases monotonically, and nodes maintain synchronization by transmitting this counter value (or a representation of the counter value) in each secured message.

The counter may alternatively be referred to herein as a key counter because it is used (along with a pre-shared key, also stored in non-volatile memory) by the cryptographic block to derive one or more session keys, as noted above. Because different nodes in a communication group may utilize the same the cryptographic function, the same key counter and the same shared key yield the same session key. As a result, when nodes synchronize to the same group-wide key counter, the nodes are in effect agreeing to use the same session key.

Again, each secured message includes the key counter or, more precisely, a representation (e.g., a portion of bits) of the key counter to enable receiving nodes to establish the group-wide key counter value using their local copies, which again are stored in non-volatile memory. This facilitates key agreement because the key counter changes infrequently. Thus, the inclusion of a portion of the key counter, such as a lower predetermined number of truncated bits, is sufficient for each receiving node to verify whether the counter value used by the transmitting node (and sent in the secured message) matches the locally stored key counter at the receiving node. And because the key counter representation is carried in every secured message, there is no need for any separate key agreement messages. In other words, the key agreement is implicit in every secured message, and therefore no delay results from waiting for a consensus of agreement among nodes, as is the case for conventional systems.

Additionally, the embodiments described herein may extend the use of key counters and pre-shared keys to guard against weak replay attacks via the implementation of a live membership tracking solution. This live membership tracking solution defines one or more membership groups that may include the entirety of the number of interconnected nodes within a system or a subset of such nodes. Once membership groups of nodes are defined, each node within a membership group may request, or "challenge" other nodes within the same membership group at any time to verify their online status. In other words, a challenging node in the membership group may request other nodes to respond to a challenge request. Such challenge requests may be made via the use of a representation of a query value encoded in the secured message, and may be contained in any field of the secured message. Advantageously, the representation of the query value may be a small field (e.g. a single bit), and thus the challenge requests may be easily added to secured messages that are to be transmitted in the course of typical inter-node communications. For instance, the representation of the query value may be added as a field or any suitable portion of a secured message that is generated and transmitted in the course of typical secured message communications among interconnected nodes in the same membership group. This advantageously obviates the need for transmitting challenge requests as part of separate, dedicated messages.

The representation of the query value may be used by each node in the membership group to identify that an online status verification has been requested from each node that has issued such a challenge. Each node in the membership group may thus maintain, via local storage, a log of query values (e.g. a bit string) corresponding to each node's challenge requests. In this way, each node in the membership group tracks an indication of each other node's challenge requests, which is correlated with each requesting node by way of a dedicated, predetermined bit position in the bit string per node in the membership group. In response to such challenge requests, each node may transmit a secured message that includes responses (e.g. in a field or other part of the secured message) that encodes its current locally-stored bit string, which identifies a responding node's current locally-stored log of challenge query values from all other nodes in the membership group. Thus, and in a similar manner as noted above for the representation of the query value, the encoded responses may likewise be relatively small (e.g. a bit string) and be added to the next secured message to be transmitted among the nodes in a membership group. Therefore, the responses to challenge requests also do not require the use of separate, dedicated messages. As noted in further detail below, the use of challenge requests and responses as part of typical secured message communications advantageously allows for enhanced security without adversely impacting messaging bandwidth.

Each node that has requested a challenge request may thus verify that a node is online by identifying whether an encoded value has been set in the secured message that corresponds to the requesting node's predetermined bit position. The encoded value at this bit position is then compared to a predetermined value (e.g., '1') and is associated with the node that previously requested the challenge by way of the reserved bit position. The encoded value contained in this bit position thus represents an affirmative response to the challenge. If this is not the case, the secured message may not be accepted, as the request for online status verification was not acknowledged by the responding node. The use of membership groups and the ability to perform such challenge requests may be particularly useful in combination with the use of the counter values and pre-shared keys discussed above, as this provides an additional layer of security to guard against weak replay attacks. This is the result of leveraging the counter validation schemes discussed herein, which ensures that the bit sting may not be manipulated.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The embodiments herein are presented in two separate Sections for ease of explanation. Section I is directed to the use secure communications that leverage locally stored key counter values in accordance with a real-time bus key distribution system that eliminates the need for dedicated key agreement messages. Section II is directed to the use of live membership groups to provide an additional layer of security. Although these embodiments are discussed separately, it is noted that any of the embodiments described in either Section I or Section II may be combined with one another, and any of the architectures, communication protocols, and/or techniques described in Section I are also applicable to the embodiments described in Section II, and vice-versa. For example, any of the embodiments as described herein with respect to Section I may optionally include the use of live membership embodiments as described in Section II as an additional layer of security to guard against weak replay attacks.

I. Secure Communications Leveraging Locally Stored Key Counter Values

As discussed in further detail below, the embodiments described herein may be implemented in accordance with any suitable communication architecture that leverages a broadcast bus to facilitate secured communications among a system of interconnected nodes. The broadcast bus may be implemented, for instance, in accordance with what is referred to as a "multi-drop" scheme. In other words, although the embodiments described herein may function in accordance with a point-to-point communication architecture, the embodiments may be particularly useful for use in a point-to-multipoint communication architecture. Furthermore, although not limited to use in real-time control systems, the embodiments described herein may advantageously be implemented as part of such systems, which require heightened considerations with respect to security, timing, and robustness compared to conventional node-based communication networks.

For instance, and using a vehicle-based real-time control system as one example, the nodes in such real-time control systems may control safety-critical components such as vehicle steering, braking, acceleration, etc. As a result, it is crucial that secured messages between these nodes be sent and received with little latency, that nodes come back online quickly after being reset, and that nodes in the system are not adversely impacted while waiting for reset nodes to come back online. Moreover, due to the increased considerations with respect to safety and to resist reverse engineering attempts, a real-time control system needs to be resistant to malicious attacks, which may attempt to gain unauthorized access to keys or other system information.

For example, one such attack includes so-called "replay attacks," which may include "strong" and "weak" replay attacks. The embodiments in this Section are primarily directed to the prevention of strong replay attacks, which force secured messages to be re-sent to other nodes out of order. To guard against such attacks, conventional systems utilize a "freshness value" (FV) to prevent replaying the same (legitimate) message to force receivers act on it at an invalid time. These conventional systems, which include the controller area network (CAN) bus and multi-drop Ethernet communication protocols such as 10BASE-T1S and 10Base-T1L, results in out-of-order frames being transmitted due to priority queueing. Thus, such conventional systems have adopted an "acceptance window," although this still allows for replay attacks but confines such attacks to a window to attempt to limit this possibility. However, the primary disadvantage of such a system is that the window may be relatively large (e.g., 1 second), and as a result this reduces but does not eliminate the possibility of exposure to replay attacks.

Other attacks include denial of service attacks using the key agreement messages. As noted above, the use of conventional key agreement protocols requires a substantial number of such messages to be transmitted within the network, which scales quadratically with the number of nodes. It is thus possible to exploit the use of such a large number of messages to maliciously trigger a key re-agreement process to cause bus traffic to be disturbed. Moreover, such attacks may be used to trigger multiple key re-agreements to cause secure traffic to stop altogether.

Additional attacks include the re-use of secure channel indicator (SCI) values, the details of which are further discussed herein, to break assumptions about nonce re-use. For instance, a malware-infected node may use SCI values assigned to another node and force the device to send messages that could re-use a nonce value, implicitly leaking the session key. Still further, attacks may include denial of service attacks on a key agreement server, which may drive the server offline with a bus off attack, thereby preventing the server from issuing new keys.

The embodiments described herein address these issues to increase the robustness of real-time control systems to such attacks. To do so, the embodiments as further described herein do not utilize key agreement messages, and instead may operate independently of a key agreement server. Thus, instead of using a centralized key agreement system, the embodiments as described herein may maintain a locally stored copy of the counter values that would conventionally be derived from a central server. Again, a representation of the counter value may be transmitted as part of each secured message, which may be used by a receiving node to validate the counter and verify the secured message.

A. Node Architecture

Figure 2A:
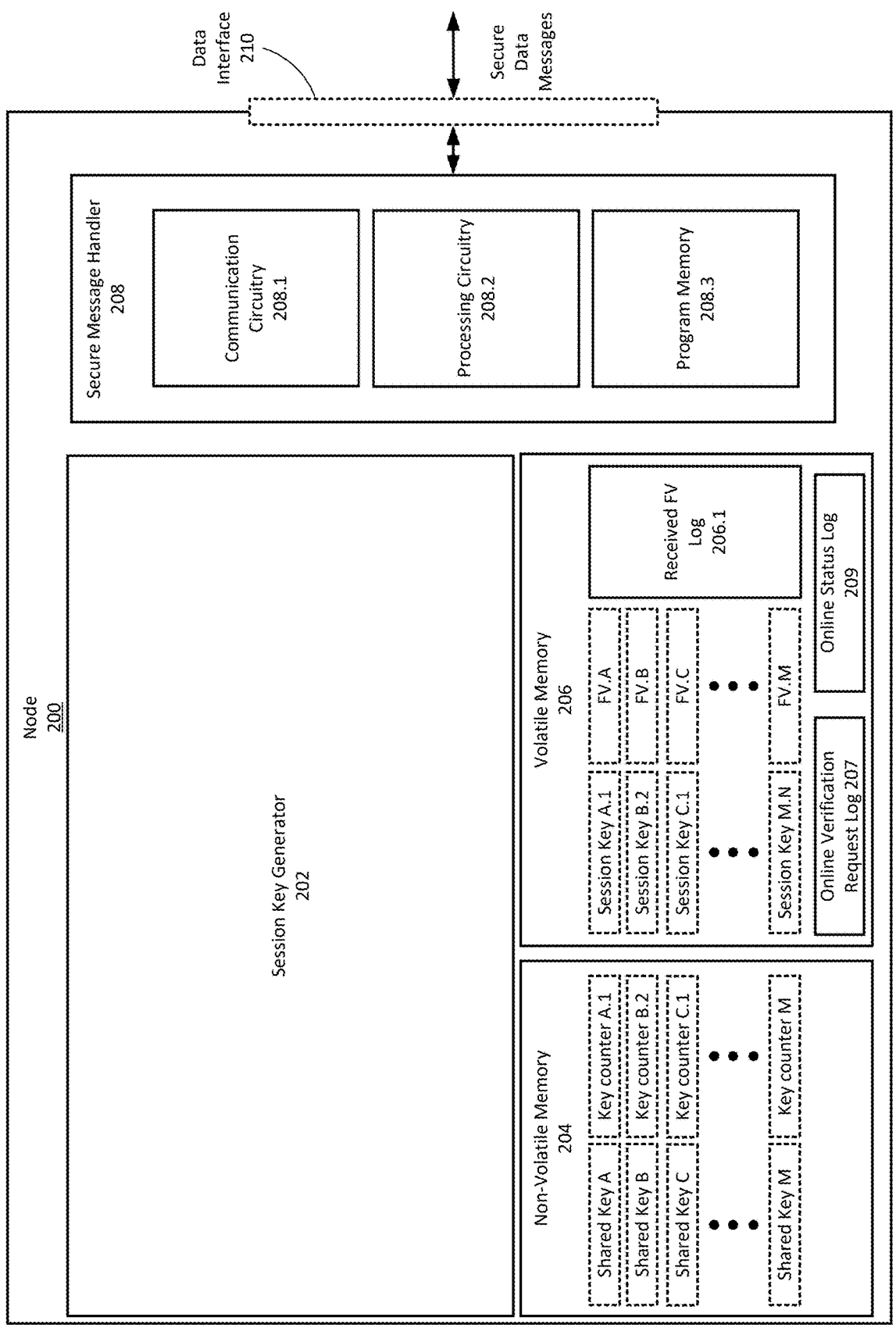
FIG. 2A illustrates an example node architecture, in accordance with one or more embodiments of the disclosure.

FIG. 2A illustrates a node architecture, in accordance with one or more embodiments of the disclosure. The node 200 may be identified with any suitable type of component, and may represent one node in a system of interconnected nodes, with such a system being illustrated in FIG. 3 and further discussed below. For example, the node 200 may be identified with part of an electronic control unit (ECU), a sensor, an actuator, a host, etc. The various nodes with such an interconnected system may differ in type and/or function, although each node may have a common functionality as discussed herein with respect to the node 200. Thus, each node in the system of interconnected nodes may be configured to transmit and/or receive secured messages in the same manner as that described herein with respect to the node 200.

The node 200 as shown in FIG. 2A may represent one node in the system of interconnected nodes configured to communicate over a bus according to a multi-drop scheme, as discussed herein. Such a multi-drop scheme may for, for example, be part of an in-vehicle E/E architecture as discussed above, which may include a CAN bus architecture or other suitable in-vehicle E/E architecture. The system of interconnected nodes may support the communication of secured messages in accordance with any suitable type of system, such as a real-time control system that may be implemented in a vehicle. Thus, the node 200 may be one of any suitable number of nodes that communicate with one another by transmitting and receiving secured messages via the data interface 210, which may be coupled to and/or form part of a bus that is used as part of any suitable type of point-to-point or multi-drop scheme. The data interface 210 may comprise any suitable number and/or type of data interface(s) to facilitate the exchange of secured messages between the node 200 and any suitable number of other nodes within the system of interconnected nodes.

The node 200 may transmit and/or receive secured messages as discussed herein to communicate with other nodes within the system of interconnected nodes using any suitable number and/or type of communication protocols and accompanying modes of operation. For instance, the node 200 may be configured to receive secured messages and to transmit secured messages in accordance with communication protocols that utilize the authenticated-encryption Galois/Counter Mode (AES-GCM)-SIV of operation, the Counter with CBC-MAC Modes (CCM) of operation, communication protocols that utilize modes of operation implementing the ShangMi 4 (SM4) cipher, any suitable type of Ethernet communication protocols (e.g. multi-drop Ethernet communication protocols such as 10BASE-T1S, 10BASE-T1L, the Ethernet MACsec standard, etc.), any suitable in-vehicle network protocols such as a Controller Area Network (CAN) communication protocol, Controller Area Network Flexible Data-Rate (CAN FD) communication protocol, a Controller Area Network Extra Long (CAN XL) communication protocol, any suitable communication protocols that implement Authenticated Encryption with Associated Data (AEAD) modes of operation, etc.

Again, the node 200 (as well as every other node in the interconnected system) is configured to transmit secured messages to other nodes and to receive secured messages transmitted by other nodes via the data interface 210. Thus, although each node in the interconnected system of nodes (which again includes the node 200) is configured to perform both transmitting and receiving functions, the term "transmitting node" is used herein when referring to any node that is currently performing the transmission of a secured message and/or performing any functions related to such secured message transmissions, whereas the term "receiving node" is used herein when referring to any node that is currently receiving a secured message and/or performing any functions related to such secured message receptions.

To perform secure message communications, the node 200 comprises a session key generator 202, a non-volatile memory 204, a volatile memory 206, and a secure message handler 208. These components are illustrated in FIG. 2A as being separate entities, with their corresponding functions being described separately for ease of explanation. However, any of the components of the node 200 may be integrated or otherwise combined with one another. The node 200 may also comprise additional or alternative components as those shown and discussed herein with respect to FIG. 2A. Furthermore, although the node 200 is shown and described herein with respect to the use of the non-volatile memory 204 and volatile memory 206, this is by way of example and not limitation. Any of the data stored in the non-volatile memory 204 and volatile memory 206 may be additionally or alternatively stored in other memories, which may be part of the node 200 or components external to the node 200. For example, any of the data that is illustrated in the Figures as being stored in a volatile memory may alternatively be stored in a non-volatile memory, and vice-versa. However, it is recognized that specific types of static data, such as the secret keys, may advantageously be stored in non-volatile memory to ensure their security. Further it may be of interest to assure persistence of static data, such as secret keys, in the event that a node goes offline and returns to the bus, as may be the case with a reboot of a node.

Furthermore, the node 200 is shown and discussed herein with respect to performing the functions of both secured message transmission and reception, although it will be understood that the node 200 may comprise separate components to perform each respective function, or alternatively comprise a combination of such components to selectively implement both functions independently of one another. Thus, the secure message handler 208 may represent an encoder, a decoder, or a combination of both an encoder and decoder to facilitate the node 200 operating in accordance with any of these aforementioned modes of operation.

The secure message handler 208 may comprise any suitable number and/or type of components, with an example of such components being shown in FIG. 2A by way of example and not limitation. For instance, the secure message handler 208 may comprise communication circuitry 208.1, which may be coupled to the data interface 210 and thus the accompanying bus of the system of interconnected nodes as discussed herein. Thus, the data interface 210 may comprise any suitable implementation of components for this purpose, such as for instance wires, buses, and/or respective terminals, ports, pins, etc. The communication circuitry 208.1 may be implemented as any suitable hardware components that enable communications between the node 200 and other nodes within the system of interconnected nodes, as further discussed herein, via the data interface 210. Thus, the communication circuitry 208.1 may transmit secured messages to the data interface 210 and receive secured messages from the data interface 210 in accordance with any suitable number and/or type of communication protocols, such as those discussed herein. To do so, the communication circuitry 208.1 may comprise hardware components, software components, or combinations of these, which are typically associated with components configured to perform data communications. For example, the communication circuitry 208.1 may comprise any suitable number of ports, drivers, transmit and/or receive buffers, switches, etc.

The processing circuitry 208.2 may comprise any suitable number and/or type of dedicated hardware components such as a microcontroller, an application specific integrated circuit (ASIC), a field programmable gate array (FPGA), a system on a chip (SoC), dedicated logic and/or other circuitry, etc. The processing circuitry 208.2 may be implemented as one or more processors and/or cores, which may execute computer-readable instructions stored in the program memory 208.3 to perform any of the various functions as discussed in further detail herein. Thus, although the processing circuitry 208.2 is illustrated in FIG. 2A as a separate entity from the session key generator 202, it is understood that the processing circuitry 208.2 may facilitate the operations of the session key generator 202 as further discussed herein, and thus the session key generator 202 and the processing circuitry 208.2 may, in some embodiments, comprise the same component(s).

The program memory 208.3 may comprise any suitable type of non-transitory computer readable medium such as volatile memory, non-volatile memory, or combinations of these. To the extent that the node 200 implements software-based solutions to perform the various functions as discussed herein, this may be achieved, for instance, via the processor circuitry 208.2 executing instructions stored in the program memory 208.3.

B. Secure Zones

Figure 3:
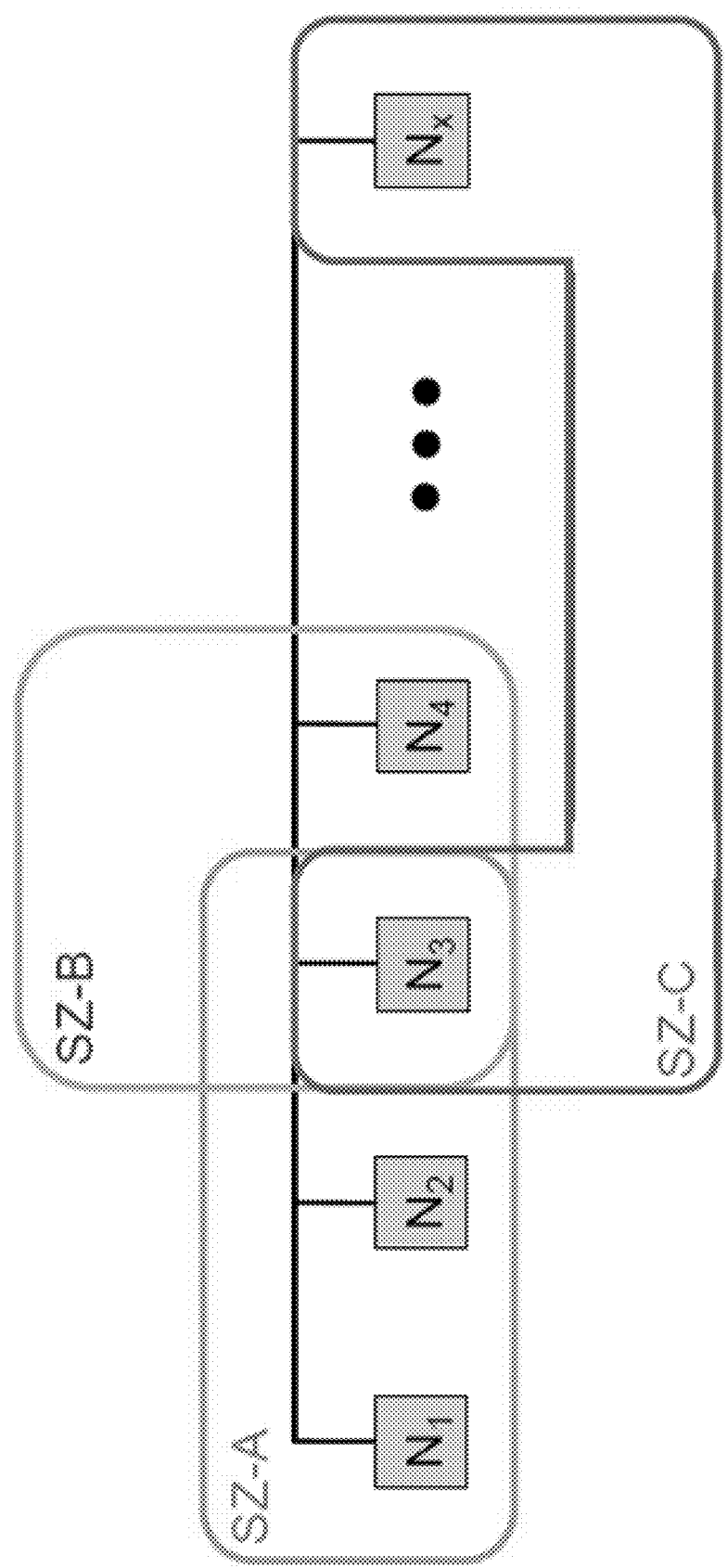
FIG. 3 illustrates an example system of interconnected nodes including defined secure zones, in accordance with one or more embodiments of the disclosure.

Again, the node 200 may represent one of several nodes that form a system of interconnected nodes. FIG. 3 illustrates an example of such a system of interconnected nodes, which comprises a total of X nodes. The node 200 may be identified with any of the nodes $N_1$-$N_X$, and each of the nodes $N_1$-$N_X$ may transmit and receive secured messages in a similar manner as the node 200 as discussed herein.

The system of interconnected nodes 300 (also referred to herein as simply a system 300) may include any suitable number of secure zones (SZ), with three being shown in FIG. 3 for purposes of brevity, which are represented as the secure zones SZ-A, SZ-B, and SZ-C. These secure zones may be defined in accordance with any of the communication protocols as discussed herein, and nodes with the system 300 may identify the intended recipients of secured messages transmitted and received within these secure zones via the use of a secure channel indicator (SCI) field, as discussed in further detail below.

With continued reference to FIG. 3, each one of the secure zones in turn comprises a respective group of nodes. For example, the secure zone SZ-A of the system 300 as shown in FIG. 3 comprises the nodes $N_1$, $N_2$, and $N_3$. The secure zone SZ-B comprises the nodes $N_3$ and $N_4$, and the secure zone SZ-C comprises the nodes $N_3$ and $N_X$. The embodiments as discussed herein may implement the transmission and reception of secured message in accordance with a particular secured zone within which the transmitting node and the intended recipients of the secured message form a part. However, the embodiments are not limited to their use with a system comprising such secure nodes, and may be realized as part of any suitable communication system, i.e., with or without the use of secure zones.

C. Key Generation and Management

To enable the use of secured messages, the node 200, as well as every other node in the system 300, stores a set of shared keys, on a secure zone basis when secure zones are utilized. In other words, each node in the system 300 stores a shared key, which may be alternatively referred to as a secret key or a shared secret, in a non-volatile (NVM) memory. Turning now to FIG. 2A, this is illustrated by way of the node 200 comprising a non-volatile memory 204, which is configured to store a shared key for each secure zone in which the node 200 is a member within the system 300. Thus, the node 200 may be identified with the node $N_3$ as shown in FIG. 3 for ease of explanation, as the node $N_3$ is a member of each of the secure zones SZ-A, SZ-B, and SZ-C. Thus, the node 200 in this case stores three shared keys A, B, and C, in the non-volatile memory 204. Of course, the node 200 may store additional or fewer shared keys based upon the number of secure zones in which the node 200 is a member. Therefore, in an embodiment, each node is configured to store, in its non-volatile memory, any suitable number M of shared keys, with M being greater than or equal to the number of secure zones to which the node is a member. For instance, the node 200 may store one shared key per secure zone, as shown in FIG. 2A, although this is by way of example and not limitation, as the node 200 may store any suitable number of shared keys per secure zone.

Thus, the NVM 204 may be implemented as any suitable type of non-volatile memory having any suitable size for storing any suitable number of shared keys. Each of the shared keys may represent a predetermined bit string or other suitable encoded numeric value having any suitable length. Each node within the same secure zone thus stores the same shared key in its respective NVM, which is used for the transmission and reception of secured messages for that secure zone, but not for other secure zones. For example, the nodes $N_1$, $N_2$ may only store the shared key A for secure zone A, whereas the node $N_2$ may only store the shared key B for secure zone B. The secret key is generally static and does not change over the operational life of a node, and thus may be flashed, written to, stored, etc., as part of an initial manufacturing process. Alternatively, the shared keys may be written to the NVM 204 via the node 200 or another suitable device. To ensure security, the shared keys are not included in the secured messages that are communicated between the nodes and are only be accessed or otherwise known by each node via its respective NVM, and thus is unknown to other nodes in the system 300.

In any event, the "permanent" shared keys are used to facilitate the generation of temporary session keys, which may be referred to herein simply as session keys, and are used for transmitting and receiving secured messages within the same secured zones. To do so, reference is now made to FIG. 2B, which provides additional details with respect to the session key generator 202 as shown in FIG. 2A. The session keys are generated using a key derivation function (KDF), which represents a specific cryptographic function in accordance with the particular communication protocol that is implemented by the node 200. The use of KDFs are generally known, and thus additional detail regarding KDF operation is not described herein for purposes of brevity.

Like the shared keys, the session keys may represent a bit string or other suitable encoded numeric value having any suitable length. In any event, once generated, the processing circuitry 208.2 may use a respective session key per secure zone to generate each secured message that is transmitted to other nodes within the same secure zone, and also use this same session key to authenticate and/or decrypt secured messages received from nodes within the same secure zone. Thus, the processing circuitry 208.2 may execute any suitable type of cryptographic function that utilizes, as a cryptographic key, the generated session keys to generate the secured messages.

Additionally, it may be particularly advantageous to implement one session key for authentication purposes and a second one for encryption purposes at one node, as some cryptographic functions require distinct keys for authentication and encryption. It is further noted that, in some alternative implementations, an individual session key may be assigned to individual nodes participating in a secure zone. In such a scenario, for each secured message, the key derivation function (KDF) may be performed (i.e., transmit and/or receive). In particular, for an implementation of the KDF via hardware, this may be performed without penalty.

It is noted that the session key generator 202 may implement any suitable type of KDF to generate any suitable number of session keys from each respective shared key. That is, the session key generator 202 is configured to generate, for each one of the secure zones, a respective temporary session key using a respective shared key and a respective key counter value in accordance with a respective cryptographic function. Moreover, for the transmission of a secured message each group of nodes within a secure zone, each respective secured message comprises a plurality of fields, as further discussed herein, with one of the fields comprising a representation of the respective counter value used to generate the session key used to generate the secured message. Additional detail regarding the content and format of the secured messages is discussed further below.

Figure 2B:
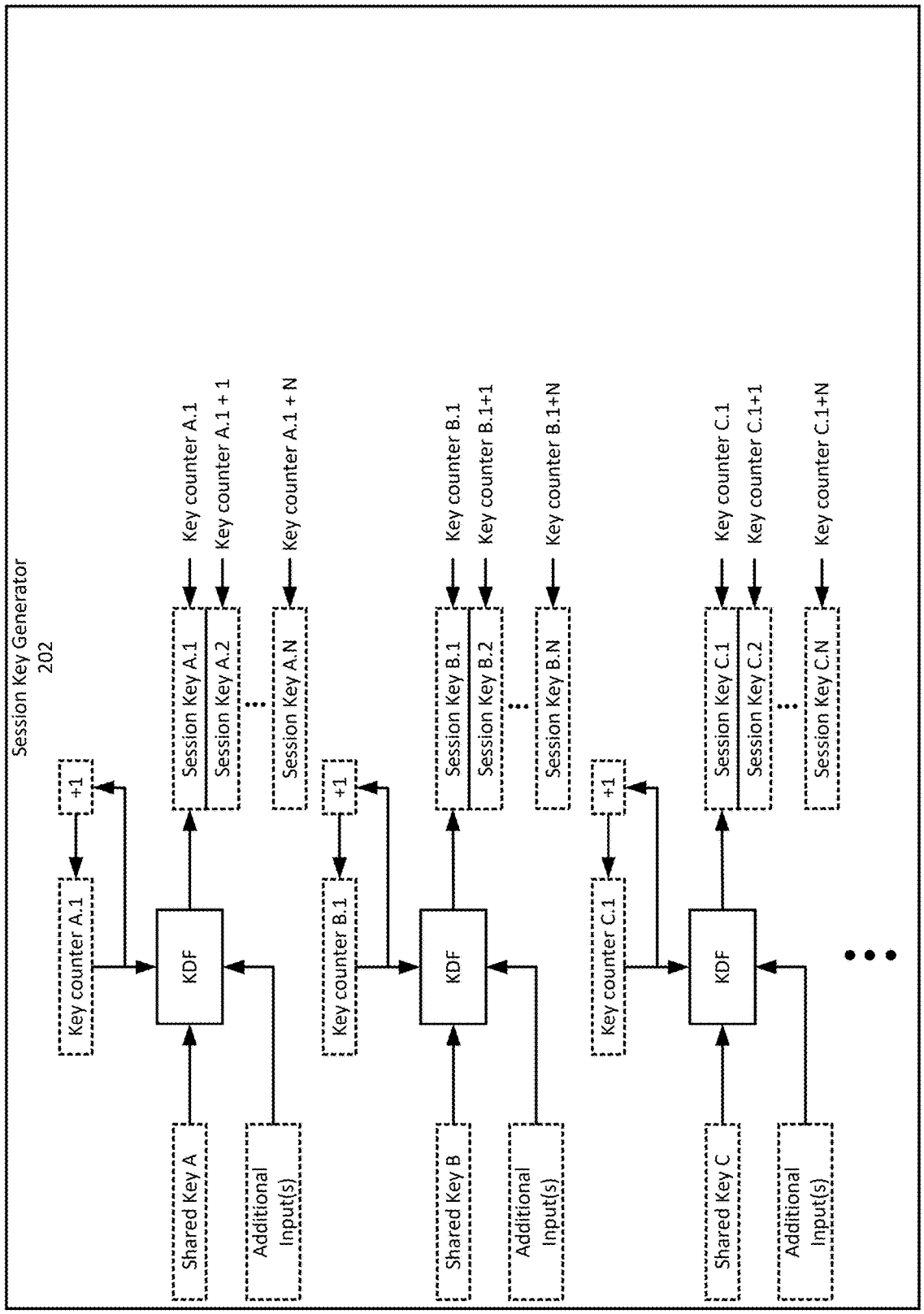
FIG. 2B illustrates an example key session generator, in accordance with one or more embodiments of the disclosure.

The communication circuitry 208.1 is also configured to transmit secured messages to each group of nodes in accordance with the secured zone to which each recipient node belongs. Therefore, although multiple session keys may be generated from a single shared key, the same session keys are used to perform secured communications to and from nodes within the same secured zone at any one time. Thus, for communications to nodes within each secure zone, the KDF receives as inputs the shared key for that secure zone as well as a counter value. Each KDF may also receive additional inputs as shown in FIG. 2B, which may be any suitable values that are selected to ensure the generated session keys are unique per secure zone. For example, the additional inputs to the KDF may comprise an SCI value, a nonce (number used only once), etc. As a result, the same shared key may be used to generate multiple session keys per zone by modifying a different input to the KDF in each case.

In any event, it is noted that the same KDF algorithm will repeatedly generate the same session key from the same inputs. Thus, and as will be described in further detail below, other nodes may be configured with the same KDFs and shared keys to authenticate and/or decrypt secured messages using their own session keys and inputs, which should then match the session keys used when the secured message was generated by the transmitting node (i.e., prior to being received by the receiving node).

Although the session keys are described herein as being used to transmit secured messages to all other recipient nodes per secure zone, this is by way of example and ease of explanation. Specifically, the session keys as described herein may be implemented to generate secured messages that may represent authentication only messages or, alternatively, both authentication and encryption messages. For example, for the various AES-GCM-based protocols (which is used in MACsec), an integrity check value (ICV) is computed in accordance with their respective algorithms. For authentication only secured messages, the ICV is computed without encrypted data, and for authenticated and encrypted secured messages the ICV is computed in parallel with the encrypted data. Authentication only messages may be particularly useful, for example, in scenarios in which a message needs to be read first to quickly perform a specific control or execute a command without first decrypting the payload of the secured message. The embodiments as discussed herein may implement any suitable algorithms to compute the ICVs, including known techniques. In accordance with these cryptographic functions used to generate the ICV, the inputs typically comprise a key (e.g. the session key), a counter value (e.g. the key counter value), the plaintext of the message (when present), and a current freshness value (FV) that is transmitted in the secured message.

In any event, based upon the particular cryptographic algorithm that is used to compute the ICV, the ICV may be generated using the same key as that used for the encryption of data (i.e. the encrypted payload) or a different key. In either case, the keys used for the generation of the ICV and for data encryption may comprise the transmitting node's locally stored session keys, which again may comprise the same session keys or different session keys, in various embodiments, which are identified with the key counter(s) for a specific secure zone. Thus, for authentication purposes, a transmitting node may utilize its locally stored session key to compute the ICV, whereas for authenticated and encrypted secured messages the transmitting node may use its locally stored session key(s) to compute the ICV and the encrypted payload. For both secured message types, the ICV is verified via the receiving node to establish authentication of the secured message, as further discussed herein.

Thus, embodiments include any suitable number of session keys being generated from the same shared key and KDF, with a different key counter value (or other different inputs) being used to generate each different session key in this manner. Alternatively, the session key generator 202 may generate any suitable number of different session keys per secure zone using the same inputs and KDF, but a different shared key, to thereby generate each different session key in this manner.

To provide an illustrative example, the session key generator 202 may be configured to generate, from each respectively stored shared key, two respective temporary session keys in accordance with the same cryptographic function. Thus, the same key counter value may be used to generate different session keys from the same shared key by varying other inputs to the KDF. Continuing this example, a first one of the temporary session keys generated in this manner may enable a receiving node to decrypt the secured message, whereas a second one of the temporary session keys generated in this manner may enable a receiving node to authenticate the secured message. In other words, the nodes within each secure zone may function in accordance with a predetermined scheme such that specific session keys are used for authentication, encryption, or both authentication and encryption, of secured messages.

Again, one variable with respect to generating different session keys from the same shared key is the key counter value, which may also be referred to herein as a counter value. Thus, each receiving node needs to ensure that its session key has been generated with the same key counter value as the transmitting node, or else the receiving node will be unable to authenticate and/or decrypt the secured message. In this way, the embodiments described herein advantageously enable nodes to synchronize their key counter values, and thus their session keys, without the use of key messages.

Thus, it is prudent to now provide additional detail regarding the conventional use of the key counter values. It is noted that conventional systems use a centralized server, control plane, host, etc., to maintain a global counter value, which needs to be communicated with the nodes as discussed above as part of the key agreement messages. However, the embodiments of the present disclosure recognize that the session keys may alternatively be maintained and derived locally, obviating the need for communications with a centralized entity for key agreement.

To do so, each node in the system 300 may comprise any suitable number of counters, with one per shared key as shown in FIG. 2B. The counters may be implemented as any suitable hardware components, software components, or combinations of these, which enables the generation of unique counter values that may be represented as any suitable number of bits. Each counter may be implemented, for example, to generate a monotonically increasing counter value that is incremented in response to one or more predefined conditions being satisfied, which may be the result of a "re-keying" event. Such a re-keying event may occur, for example, in response to any suitable number of conditions, which may be voluntary or triggered by a security alert. For example, a node may perform a re-keying when a number of secured messages are transmitted with a respective session key in excess of a predetermined number of messages (i.e., session key "exhaustion"), the expiration of a predetermined time period, each system boot, etc. To provide another example, the re-keying conditions may comprise a security alert that may be detected by a centralized server, another node, a host processor, etc. The security alert may be sent to the node 200 via the data interface 210 or other suitable data interface, and explicitly instruct the node 200 to perform a re-keying process.

Thus, the processing circuitry 208.2 of the node 200 may periodically perform a re-keying process in accordance with the various conditions as discussed above. In an embodiment, the processing circuitry 208.2 may implement a rate-limiter that is configured to limit the number of re-keying operations within a particular time period. This may include, for example, a prioritization-based system that may be implemented via the node 200. Such a system may account for watchdog reset loops, for example, and comprise the storage of one or more priority flags in the NVM 204, the presence of which overrides the triggering of the re-keying process. For example, the non-volatile memory may store such a flag, which is indicative of some event that, when present, overrides the re-keying process. Thus, while the flag is stored in the NVM 204, the processing circuitry 208.2 will not perform a re-keying operation despite any of the aforementioned conditions being met. The priority flag may be cleared after the passage of a predetermined time period, once the event has ended, etc., such that the key counter is not incremented while the priority flag is set.

In some embodiments, the processing circuitry 208.2 may implement (e.g. via execution of instructions stored in the program memory 208.3) a stable storage algorithm, which may alternatively be referred to as an atomic storage algorithm, to perform the re-keying process. Stable storage is a classification of computer data storage technology that guarantees atomicity for any given write operation and allows software to be written that is robust against some hardware and power failures. To be considered atomic, upon reading back a just written-to portion of the disk, a storage subsystem should return either the write data or the data that was on that portion of the disk before the write operations. Stable storage algorithms generally aim to eliminate corrupted data in storage. To do so, the data is stored more than once, or with an error correcting code, so that it is possible to always read the most recent non-corrupted value. The use of such a stable storage algorithm may be particularly useful to guard against a power failure or glitch during the incrementation process not resulting in a corrupted key counter value.

In such a case, the session key generator 202 stores the updated (i.e., incremented) key counter value in the non-volatile memory, e.g. by overwriting the previous key counter value for that shared key with a new key counter value. The session key generator 202 also generates, from the respective shared key and the incremented key counter value, an updated temporary session key in accordance with the KDF, as shown in FIG. 2B. Thus, the session keys are generated via the KDF from the shared keys and the current key counter values (as well as other inputs), with the shared keys and the counter key values both being stored in the NVM 204. As re-keying events may be secure zone specific, this is illustrated in FIG. 2A via the key counter for secure zone B being incremented, whereas the key counter values for secure zones A and C are not.

For example, and as shown in FIG. 2A, the NVM 204 may store any suitable number of key counter values, which are correlated to each of the stored shared keys. In this way, the NVM 204 stores, for each one of the secure zones, a respective shared key and a respective key counter value. That is, the key counter values may be different than one another among the different secure zones, although the value of each key counter may be synchronized among the nodes within each secure zone, as further discussed herein.

A representation of this key counter value may be included in each secured message in unencrypted form, i.e., "in the clear." Therefore, and as discussed in further detail below, each receiving node may verify the validity of the key counter value based upon a comparison of the key counter value representation in the received secured message with the receiving node's locally stored key counter value. Because each node in the system 300 may store key counter values in this way, a receiving node may determine whether a counter value that is computed from the counter value representation contained in the secured message matches the locally stored counter value.

If not, then the receiving node may increment and overwrite its locally stored key counter value to match the counter value used to generate the session key and secured message, pending verification of the secured message as discussed in further detail below. That is, prior to updating the locally stored key counter value in this way, the receiving node may validate the key counter value represented in the secured message by generating a session key (via its session key generator) from the computed counter value (i.e., the counter value representation sent in the secured message). This temporary session key is then used at the receiving node to verify a corresponding integrity check value (ICV) contained in the secured message. In other words, the representation of the counter value in the secured message enables a receiving node to derive a temporary session key, which is used to validate the counter value used by the transmitting node to generate the session key that was used to generate the secured message. This process is described in further detail below.

Again, the session keys generated by the session key generator at any time are considered temporary, and may be changed upon the key counter values being incremented as noted above. Thus, the volatile memory 206 is configured to store each of the session keys generated via the session key generator 202. The temporary session keys may be overwritten or deleted as updated session keys are generated (e.g. upon the counter value being incremented), as discussed above.

The secured messages may also be transmitted with a representation of a sequence number. The sequence number may comprise, in some embodiments, a freshness value (FV), such as the freshness value that is defined in accordance with any of the communication protocols as described herein. However, although referred to herein as a freshness value, the sequence numbers are not limited to freshness values as defined in any specific communication protocol or standard, and may comprise a bit string or other suitable encoded numeric value having any suitable length, which may be used to enhance security measures by preventing a replay attack.

Thus, the freshness value is also a changing, temporary value, and thus the volatile memory 206 may also store the most recent freshness value for each transmitting node that is correlated to each session key (and in turn the key counter value), as shown in FIG. 2A. As a security measure, the processing circuitry 208.2 may increment the freshness value after each secured message is transmitted and after each secured message is received. That is, the freshness value may have an initial, predetermined value (e.g., 1) that is incremented by a transmitting node when each secured message is transmitted and is also incremented by a receiving node as each secured message is received.

It is noted that the secured messages may arrive at a receiving node out of order, i.e. the buffering scheme used by a transmitting node will typically send a higher priority message ahead of a lower priority one. Thus, conventional systems typically accept out of order messages, but use a "window" so replayed messages will need to be relatively recent, with the hope that this provides adequate protection against such attacks. Furthermore, conventional systems use multiple sequence numbers at each transmitting node (one for each secure channel) and then the transmitting node ensures that within each of its secure channels, the sequence numbers are transmitted in order.

Due to the use of key counter values as described herein, the embodiments as discussed herein extend this conventional use of the freshness values in several different ways. First, each receiving node stores a log of previously received freshness values that were contained in previously received and accepted secured messages, which are correlated to each transmitting node, secure zone, and current key counter value. The number of logged freshness values stored in this manner may be any suitable number depending upon the particular application.

Figure 2C:
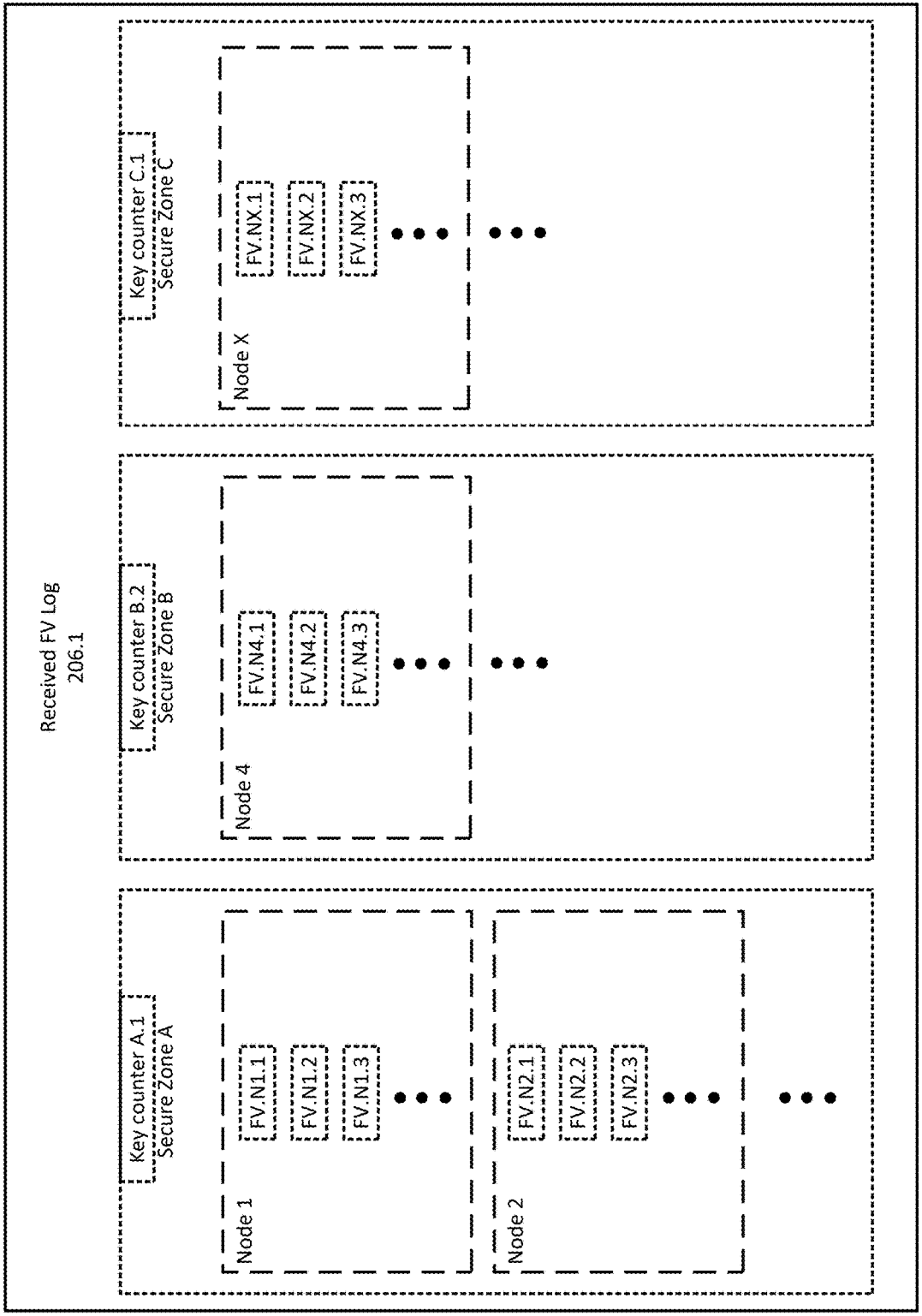
FIG. 2C illustrates an example received freshness value (FV) log, in accordance with one or more embodiments of the disclosure.

Additional details regarding the log of received freshness values are shown in FIG. 2C, which illustrates that each key counter value is correlated with its previously received freshness value numbers for each transmitting node and per secure zone. Thus, the received FV log 208.1 as shown in FIG. 2C includes one set of logged freshness values per node, because each of the nodes is part of only one secure zone in this example. However, this is by way of example and not limitation, and the received FV log 208.1 may store any suitable number of freshness values for each transmitting node based upon the number of secure zones within which each node is a member. For example, if the node $N_4$ was also a part of the secure zone A, then the received FV log 208.1 would also store a log of freshness values received from node $N_4$ via the secure zone A (not shown).

Thus, the receiving node uses the freshness value in each received secured message to determine whether a current secured message from a specific transmitting node has already been received. To do so, the receiving node references the stored set of logged freshness values for that particular transmitting node, which may be identified via the transmitted SCI value, as further discussed below. In the event that a new received secured message does not have a freshness value greater than the last recorded freshness value, then the secured message is discarded as a replay. It is noted that the first secured message received is always accepted by the receiving node, i.e. prior to the history of previously received freshness values being available.

Second, when the local key counter value is changed (i.e. during a re-keying process in which the key counter value is incremented), the transmitting node resets the freshness value (for the particular secure zone for which the key counter was reset) to an initial, predetermined value (e.g. 1). The receiving node is configured to recognize the initial freshness value in a secured message that is received after such an event occurs. Thus, after a re-keying event occurs, the receiving node may continue to store any suitable predetermined number of the last received freshness value for previously-used key counter values so that older secured messages still working their way through the priority queues (and hence with old counter values) are still validated even after the receiving node has moved on to using a new key counter value. Alternatively, freshness values stored in this manner may be deleted after a predetermined time period has elapsed upon using a new key counter value. In this way, a receiving node may still receive and accept secured messages across a rekeying event, and will accept the first message transmitted after a re-keying process has occurred.

The freshness values may serve different purposes for both the transmitting and receiving nodes. For instance, a transmitting node may compare the incremented freshness value after transmitting a secured message to a predetermined freshness value threshold to determine whether a threshold number of secured messages have been transmitted, thereby triggering the re-keying process as noted above. For example, because the transmitting node generates and stores a different session key for each secure channel, the transmitting node may use the freshness value to count messages using the session key, i.e. a number of secured messages transmitted per session key. When the freshness value for a particular secure zone reaches a predetermined threshold value, the transmitting node may increment the key counter as part of a re-keying process as noted above.

Thus, the predetermined threshold value may comprise a value per node or a value that represents a sum across any suitable number of nodes, such as those within the same secure zone, for instance. In other words, when the same session key is in use across all other transmitting nodes in the same secure zone, a quota may be established for this threshold such that the quota for all nodes in the secured zone sums to less than an exhaustion count (i.e. the predetermined threshold value) for the session key.

In an embodiment, the exhaustion counter may be implemented using the transmitting node ID (or SCI) in the KDF used to generate the session keys, such that there are unique session keys for each transmitting node. In this case, a transmitting node's exhaustion count may be identified with the use of its own session key, which reduces the number of re-keying processes because the quota is not shared among several nodes.

Thus, the KDF implemented by the session key generator 202 may optionally receive, as part of the additional inputs as shown in FIG. 2B, a secure channel identifier (SCI), which is unique across the system. The concept of a secure channel, and the carrying of a secure channel identifier, is part of the Ethernet MACsec standard as well as other communication standards, and is further discussed below.

D. Secured Message Format and Communication Protocol

Figure 4A:
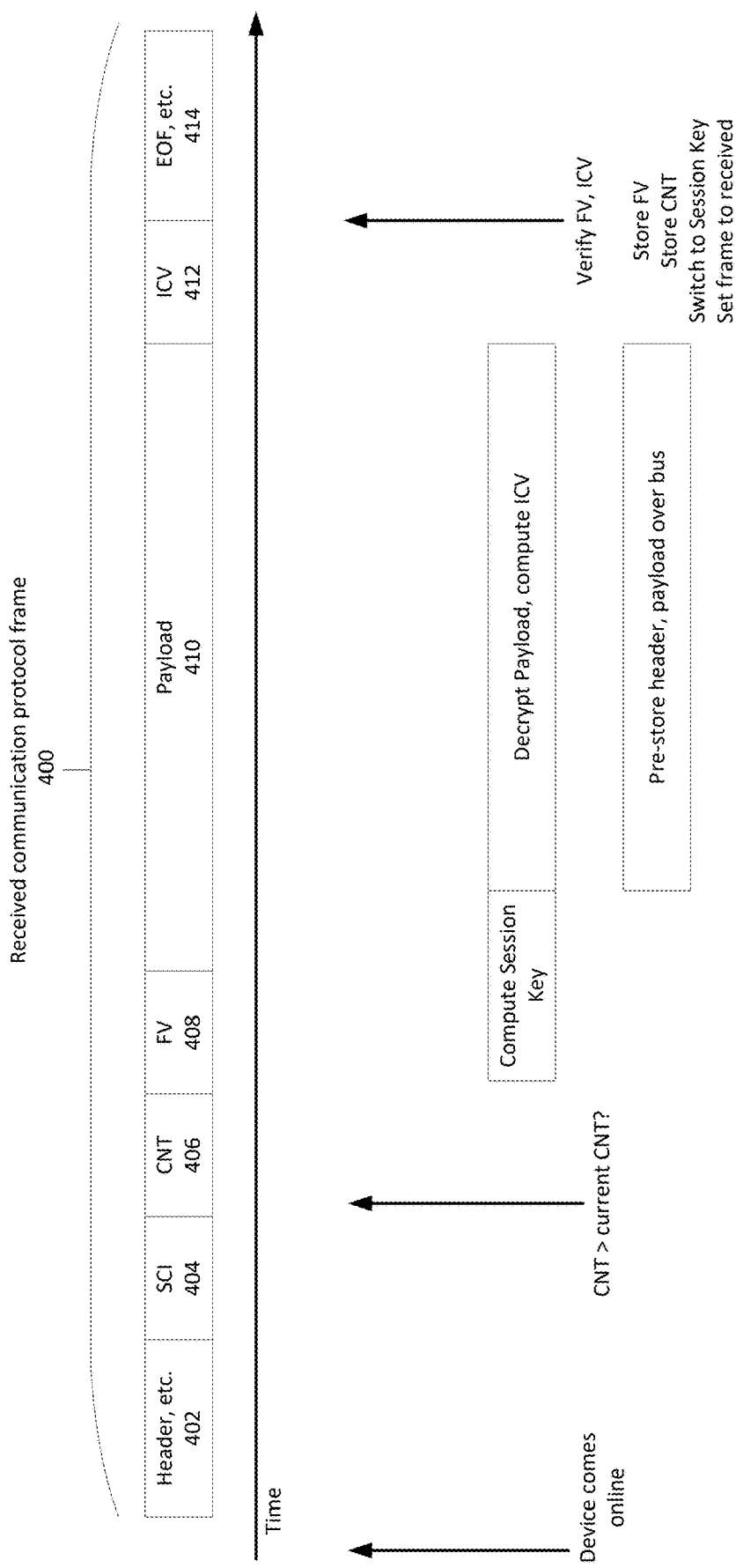
FIG. 4A illustrates an example format of a received secured message, in accordance with one or more embodiments of the disclosure.

FIG. 4A illustrates a secured message format and accompanying processing timeline, in accordance with one or more embodiments of the disclosure. The secured message as shown in FIG. 4A may be transmitted in accordance with any suitable communication protocol, and may constitute a communication protocol frame 400 comprising any suitable number of fields. Again, the communication protocol, and thus the accompanying communication protocol frame 400 as shown in FIG. 4A, may be identified with any suitable type of communication protocol that may be implemented to facilitate the communication of secured messages via a multi-drop bus architecture. For instance, the communication protocol frame 400 may be identified with a CAN communication protocol frame, a CAN FD communication protocol frame, a CAN XL communication protocol frame, an Ethernet (e.g., multi-drop Ethernet such as 10BASE-T1S, 10BASE-T1L) communication protocol frame, etc.

In any event, the communication protocol frame 400 may be identified with a secured message that is generated by a transmitting node using a temporary session key for a specific secure zone, as discussed herein with respect to the node 200. The communication protocol frame 400 may include additional, fewer, or alternate fields as shown in FIG. 4A. For example, the communication protocol frame 400 comprises a header 402, an SCI 404, a representation of the counter value (CNT) 406 used to generate the secured message, a freshness value 408, a payload 410, an ICV 412, and an end-of-frame (EOF) identifier 414. The communication protocol frame 400 may be subsequently received by a receiving node as a secured message, which is either accepted or rejected, as further discussed below.

A secure channel within a secure zone comprises a single writer and multiple readers, and thus identifies a secure zone comprising nodes within the system of interconnected nodes that are intended recipients of a secured message. An SCI value may be identified via various communication protocols, such as the CAN XL communication protocol and the Ethernet MACsec standard. For example, according to the MACsec standard, the secure zone is defined by the shared key, and that SCI is used to identify a transmitting node. For example, the SCI may be used as one of the inputs to the KDF to generate unique session keys for each transmitter.

Each secure channel is thus identified with a respective SCI, and is unique in the physical and logical network. Thus, the secure zones SZ-A, SZ-B, and SZ-C as shown in FIG. 3 are each defined by a separate and unique SCI. The processing circuitry 208.2 of the node 200 is configured to generate the secured message having comprising an SCI value that indicates which one of the secure zones for which the secured message is intended, i.e. the SCI identifies the secure channel and, in turn, the recipients within the secure zone to which the message is transmitted. The communication protocol frame 400 is assumed to be received by a receiving node that is in the same secure zone as the transmitting node, which again is indicated via the SCI value. Another use for the SCI to avoiding the window problem for out of order freshness values. That is, different SCIs can be used for different priorities so that they are in-order within the same SCI (and therefore the FV is attached to an SCI rather than a transmitting node). The SCI may also be used at the application level to identify a subgroup of receiving nodes within a secure zone.

The representation of the counter value 406 (also referred to herein as CNT 406) may comprise the entire key counter value that was used by the transmitting node to generate the session key or, alternatively, a truncated portion of the key counter value. For instance, the CNT 406 may comprise a predetermined number of lower significant bits (e.g., 4, 6, 8, etc.) of the full length key counter value that the CNT 406 represents.

Thus, a receiving node (e.g. the processing circuitry 208.2) may determine whether its local key counter value stored in the NVM 204 matches the CNT 406 by comparing either the entire stored key counter value for the secure zone as indicated by the SCI or, alternatively by comparing the truncated portion of the CNT 406. Comparing only the truncated lower significant bits of the counter value in this way is sufficient because the key counter value does not change frequently, e.g. only in response to the re-keying conditions as noted herein.

Continuing this example, if the receiving node's locally stored key counter value is determined to match the key counter value derived from the CNT 406, then the receiving node may retain its locally stored key counter value as is, determine that the key counter value represented by CNT 406 is valid, and accept the secure message. Additionally or alternatively, the receiving node may determine that the key counter value represented by CNT 406 is "provisionally" valid when the receiving node's locally stored key counter value is determined to match that derived from the CNT 406, i.e. subject to further verification processes.

For example, the processing circuitry 208.2 of the receiving node may be configured to validate the key counter value represented by the CNT 406 by verifying the secured message in various ways. Thus, upon verification of the message, the key counter value derived from the CNT 406 is determined to be valid, and thus the secured message is accepted. The verification may include, for example, the receiving node calculating a session key from the key counter value that is derived from the CNT 406. Thus, the session key that is generated in this manner should match the session key used by the transmitting node to generate the secured message, and should also match the session key stored locally at the receiving node when the key counter value that is derived from the CNT 406 matches the receiving node's locally stored key counter value. Thus, the verification of the message may be performed by the receiving node via the use of the session key that was generated from the key counter value derived from the CNT 406, which is used to decrypt contents of the secured message to derive and verify an ICV, as discussed in further detail below.

However, if the receiving node's locally stored key counter value is less than the key counter value derived from CNT 406, this means that the locally stored key counter value is out of date, and the receiving node executes a re-keying process to update the locally stored key counter value by overwriting the current key counter value with a new key counter value that matches the key counter value represented by CNT 406. Additionally, for the session keys associated with the current secure zone (as indicated via the SCI), upon verifying the validity of the counter value via the ICV check process described above, the receiving node generates an updated session key from the updated key counter value and overwrites its previously stored session key with the updated one, which should now match the session key used by the transmitting node to generate the secured message.

In other words, the processing circuitry 208.2 of the receiving node is configured to update the locally stored key counter value to match the computed key counter value derived from CNT 406 when the locally stored key counter value is less than the locally stored key counter value, but to not update the locally stored key counter value when the two key counter values already match one another. Thus, and as further discussed below, validating the key counter value represented by CNT 406 may comprise verifying the secured message based upon processing one or more fields of the secured message. This may comprise, for instance, using either a currently stored session key or generating an updated session key from the corresponding shared key stored in the receiving node's non-volatile memory, as the case may be, and then using the session key (or the updated session key, as the case may be) for secured message verification, as discussed in further detail below.

Furthermore, if the receiving node's locally stored key counter value is determined to be greater than that derived from the CNT 406, then the receiving node may retain its locally stored key counter value as is, conditionally determine that the key counter value represented by CNT 406 is invalid, and conditionally reject the secured message. Thus, the processing circuitry 208.2 of the receiving node is configured to determine that the key counter value represented by the CNT 406 is invalid, and to conditionally reject the secured message when the key counter value that is computed from the CNT 406 is less than the locally stored key counter value, as this is indicative of a replay attack, a stale message, or a corrupted message.

The conditional rejection of the key counter value is discussed further below, and may include, for example, a further determination regarding whether the key counter value derived from the CNT 406 in the secured message is nonetheless within a predetermined time frame, which may alternatively be referred to herein as a "grace period." This grace period may represent, in some embodiments, a predetermined time period (e.g. 500 ms, 1 second, etc.) such that old key counter values are accepted within the grace period. Thus, the grace period may represent an age of the derived key counter value since the last (different) key counter was received. Additionally or alternatively, the grace period may be determined based upon a number of freshness values associated with the derived key counter value. In this way, communication is not interrupted for a specified period of time after a re-keying event has occurred. However, once the grace period has lapsed, messages with old derived key counter values may be rejected, thereby reducing the risk of replay attacks.

Figure 4B:
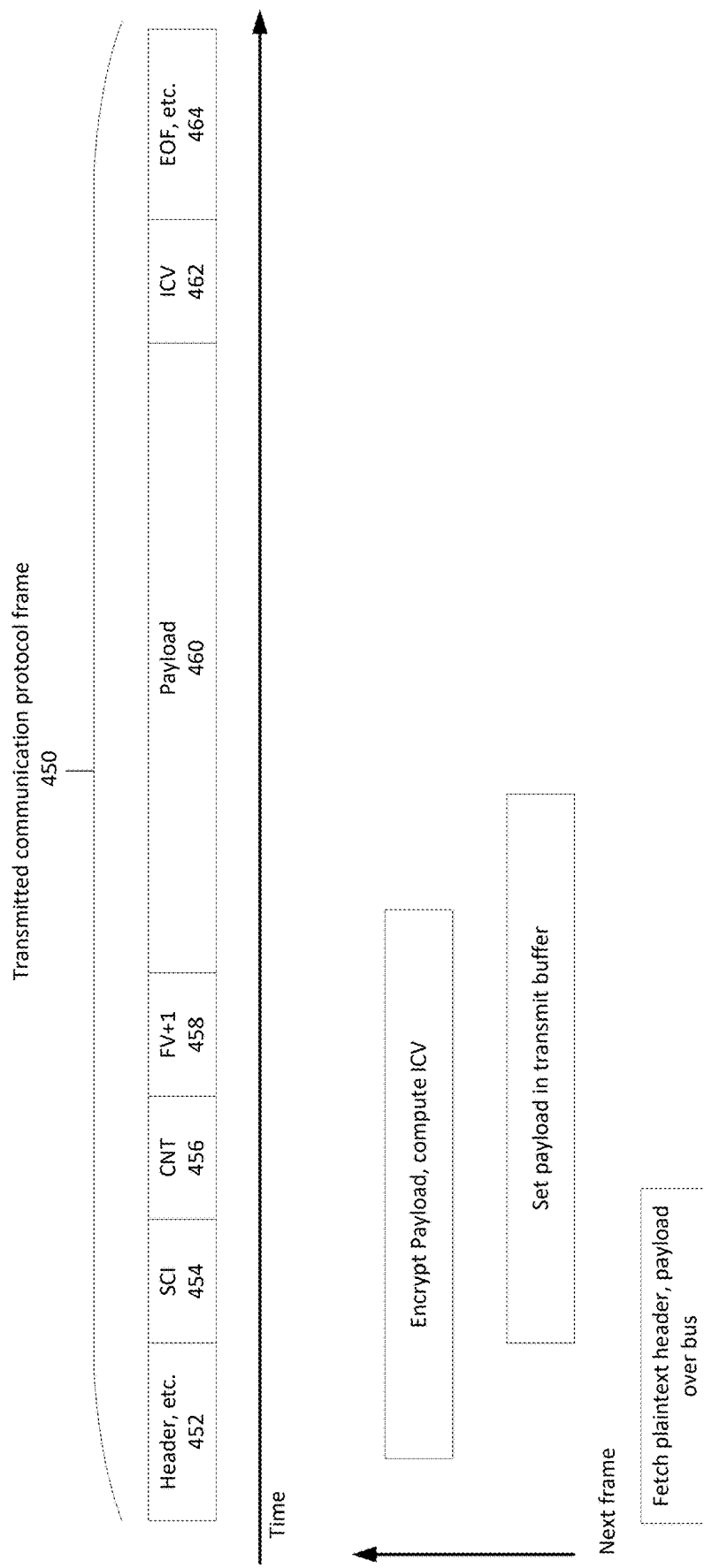
FIG. 4B illustrates an example format of a transmitted secured message, in accordance with one or more embodiments of the disclosure.

Thus, in each case, the receiving node either accepts or rejects the secured message based upon the determined validity of the key counter value that is computed from the CNT 406. Again, the secured message verification process implemented by the receiving node may utilize additional techniques to perform the key counter value validation to determine whether to accept the message. For example, the secured message may contain a sequence number field, which is shown in FIGS. 4A and 4B as the freshness value (FV) 408. The freshness value may also be included in unencrypted form as part of the secured message, as further discussed herein. The representation of the freshness value, which may alternatively be referred to herein as the FV 408, may comprise the entire freshness value that is used by (and stored by) the transmitting node when generating the secured message or, alternatively, a truncated portion of the freshness value such as a predetermined set of lower significant bits. Thus, a receiving node may, as an added layer of security, verify whether the freshness value in a received secured message matches the freshness value stored in the receiving node's volatile memory (i.e., after the FV is incremented upon receiving the secured message). If not, then the message may be discarded, as the secured message may be part of a replay attack and/or the secured message has been sent out of order. Additional details regarding the use of the freshness values are discussed below with respect to FIGS. 7A and 7B.

The payload 410 may be encrypted via the processing circuitry 2080.2 of the transmitting node using the session key. This encryption process may be performed in accordance with any suitable cryptographic function, including known cryptographic functions. Again, in various scenarios, the secured messages as discussed herein may comprise authentication only messages or may comprise authenticated and encrypted messages. The payload 410 may thus comprise either plaintext that is part of an authentication only message (or be omitted), or alternatively, data that has been encrypted via the transmitting node, i.e. ciphertext.

Moreover, the communication protocol frame 400 comprises a field containing an ICV 412, which is generated by the processing circuitry 208.2 of the transmitting node. The ICV may be computed in accordance with any suitable techniques, including known techniques defined in accordance with any of the communication standards as discussed herein. For example, the ICV may comprise a bit string of a predetermined length, which is computed by the processing circuitry 208.2 based upon any suitable cryptographic function such as e.g. a Cyclic Redundancy Check (CRC) or Hash-based Message Authentication Code (HMAC). The ICV may thus be computed by executing an appropriate cryptographic function, as noted above, using, as inputs, the current key counter value and/or the plaintext of the payload 410. The ICV may comprise data representing a dedicated field or data representing a combination of data from other fields of the secured message 400 as shown in FIG. 4A for example. For instance, the ICV may comprise any suitable combination of the header 402 (including a security tag), the full key counter value represented by CNT 406, the plaintext payload 410 or the ciphertext payload 410, etc.

The ICV 412 may be transmitted as part of the secured message in the clear, although the payload 410 needs to first be decrypted by the receiving node to compute and verify the ICV with the same cryptographic function with which the ICV 412 was generated by the transmitting node. To do so, the receiving node may compute the session key (for that particular secure zone) using the locally stored key counter value corresponding to the computed key counter value derived from the CNT 406. Again, these key counter values (either initially or upon re-keying) should match one another when the key counter value derived from the CNT 406 is valid. In other words, and as noted above, the receiving node's stored key counter value may already match that used by the transmitting node, or may be updated to match that used by the transmitting node via the receiving node performing a re-keying process to update its key counter value, as the case may be.

In any event, once the receiving node generates a temporary session key from the key counter value computed from the CNT 406, this should match the session key used by the transmitting node to generate the secured message prior to being received at the receiving node. This generated session key should also match the locally stored session key at the receiving node assuming that the key counter value used by the transmitting node to generate the secured message generated is the same as that stored locally in the receiving node. That is, because the same KDF, key counter value, and shared key are used by the transmitting node and receiving node, this will yield identical session keys being output in each case. The receiving node may then use the generated temporary session key to decrypt the payload 410, and utilize the same cryptographic function as that used by the transmitting node to compute the ICV. The receiving node may thus compare the ICV computed in this way to the ICV 412 to determine that the computed key counter value derived from the CNT 406 is valid, and to thereby verify the secured message when the ICVs match, and thus accept the secured message. The receiving node may reject the message when the ICVs do not match, as the secured message is not verified, and thus the key counter value is not validated.

FIG. 4B illustrates another secured message format and accompanying processing timeline, in accordance with one or more embodiments of the disclosure. The secured message format as shown in FIG. 4B is identical to that shown in FIG. 4A with respect to the message format and fields. Thus, each of the fields 452, 454, 456, 458, 460, 462, and 464 may be identified with the same analogous fields 402, 404, 406, 408, 410, 412, and 414 of the secured message as shown in FIG. 4A. However, the secured message format as shown in FIG. 4B may be identified with a subsequent secured message that is transmitted by the receiving node as discussed above after receiving the secured message as shown in FIG. 4A. Thus, upon receiving and accepting the secured message as shown in FIG. 4A, the receiving node may store the freshness value (or a portion thereof) in its volatile memory, as discussed above and with respect to FIG. 2C. The receiving node may then increment this freshness value when transmitting a subsequent message and store this incremented freshness value in its volatile memory as well, as shown in FIG. 2A. This is illustrated in FIG. 4B by way of the FV+1 field 458.

Thus, the receiving node may become a transmitting node and transmit the secured message as shown in FIG. 4B. To do so, the (now) transmitting node may access from its volatile memory a session key in accordance with the current key counter value and secure zone corresponding to the recipient node(s) of the transmitted secured message. As part of this process, the transmitting node may compute the ICV and encrypt the payload to generate the payload 460. The transmitting node also computes the current SCI based upon the secure zone of the recipient node(s) of the secured message, as well as the counter value representation CNT 456, which is based upon the current key counter value used to compute the session key for that particular secure zone, as discussed above. Once the information for each of these fields is computed, the transmitting node then assembles and transmits the secured message, as discussed above, with the process being repeated as needed for each of the receiving nodes in the system 300.

E. Hardware Implementation Examples

Figure 5:
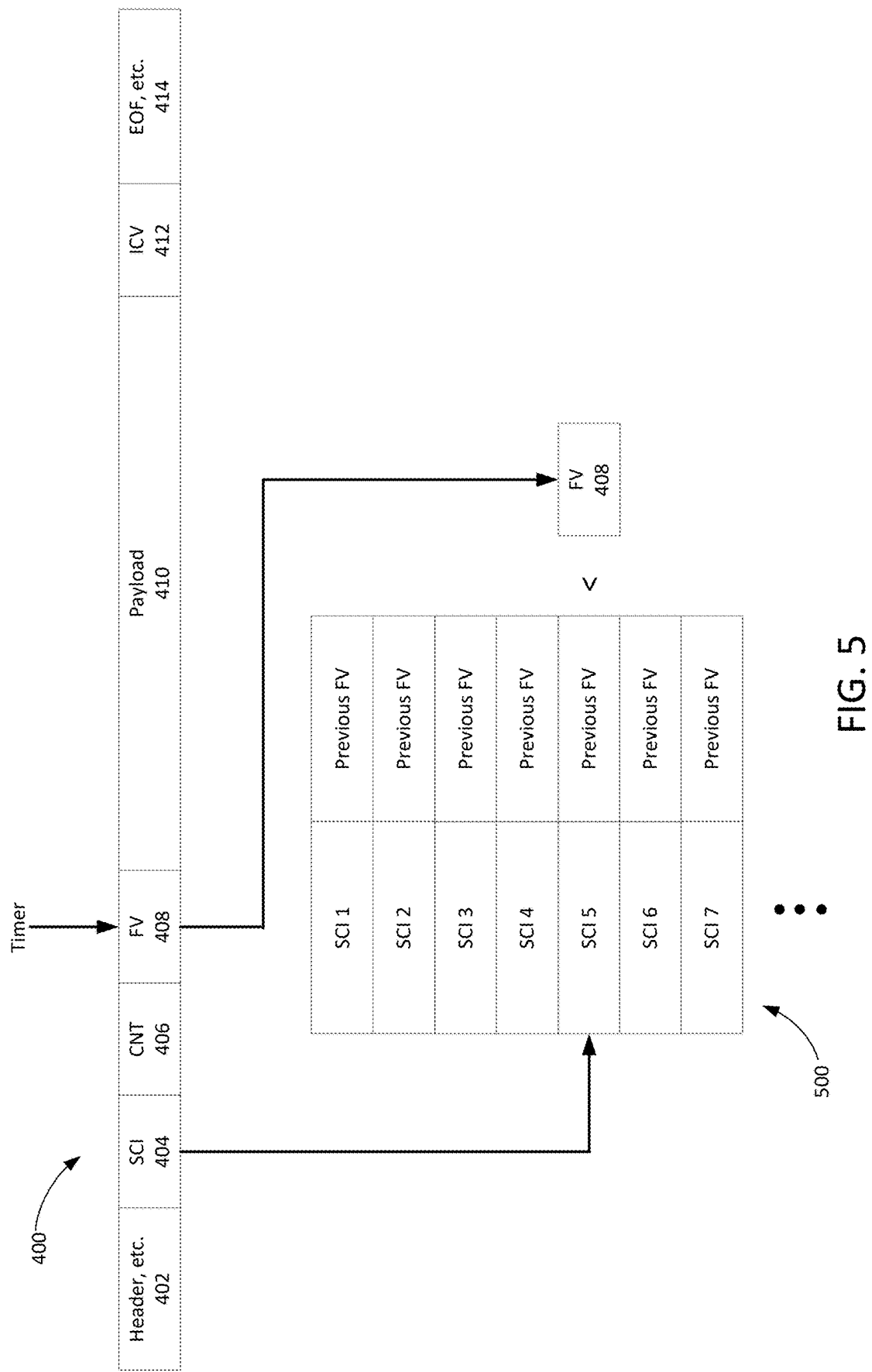
FIG. 5 illustrates an example use of a hardware-based solution for utilizing freshness values, in accordance with one or more embodiments of the disclosure.

FIG. 5 illustrates the use of a hardware-based solution for utilizing freshness values, in accordance with one or more embodiments of the disclosure. FIG. 5 shows the communication protocol frame 400 from FIG. 4A, which includes a plurality of fields. The communication protocol frame 400 is identified with a secured message generated via a transmitting node. It is noted that if the freshness values are generated as noted above via a software-based approach, the transmitting node may re-order secured messages, which are then received out of order by each of the receiving nodes. Although the window of acceptance with respect to replay attacks may allow for receiving nodes to accept such messages, the use of a software-based approach consumes considerable processing overhead.

Thus, the solution described with respect to FIG. 5 enables a transmitting node to alternatively generate the secured messages "on the fly," as opposed to being buffered and reordered, which is the conventional manner in which secured messages are transmitted. To do so, the transmitting node may implement any suitable type of timer mechanism. For example, each transmitting node may utilize a timer that references a tick time that represents a predetermined timer value, such as 10 microseconds, 5 microseconds, etc. Thus, the freshness value may still represent a string of bits, but these bits may comprise a binary representation of a number of "ticks," with each tick corresponding to a predetermined tick time. This obviates the need for the transmitting node to store the freshness values for each secured message that is transmitted, as shown in FIG. 2A, assuming that the timer ticks faster than the message transmission time. In this regard it is noted that a freshness value in any event should not be re-used for two messages. Thus, the freshness value as discussed herein may be implemented generally as any suitable type of monotonically increasing counter, and as discussed with respect to FIG. 5 may comprise for example a tick timer, a single sequence number counter, etc.

The use of the timestamp for the FV may advantageously support a system in which secured messages are not re-ordered by the buffering scheme at the transmitting node, and therefore the transmitting node only needs one secure channel. This may be the case, for example, when secured messages are generated upon their transmission (i.e. done in hardware linked to a communications protocol engine). This reduces the storage and processing overhead associated with multiple secure channels. In this way, the hardware-based solution allows for a simplification of the SCI to a single, fixed channel on the transmitting node side, as the use of the timestamp ensures that the FV is always increasing per secured message.

Thus, for the hardware-based solution as shown in FIG. 5, the transmitting node may utilize a fixed SCI value that corresponds to a unique device address for that particular transmitting node. This SCI value is thus unique across the system 300. As a result of this modification, the receiving node may additionally or alternatively store, in its non-volatile memory 204 and/or the volatile memory 206 as shown in FIG. 2C, data as shown in the table 500. For example, the table 500 represents a mapping of SCI values (i.e., unique transmitting node addresses) to previously transmitted freshness values (i.e. timestamps). The table 500 may be stored in the form of a lookup table to facilitate such a hardware based solution. The table 500 may include a unique SCI value corresponding to each transmitting node from which the receiving node is configured to receive secured messages, with 7 being shown in FIG. 5 for purposes of brevity, as the table 500 may store any suitable number of SCI and FV values for received encoded messages based upon the particular application.

The receiving node may thus implement a hardware-based solution (e.g., via processing circuitry 208.2) that is configured to scan the data entries in the table 500 until a matching SCI value is found for the SCI 404. For this table entry (i.e., SCI 5 in this example), the table should contain a previous freshness value that is less than the current FV 408. If the FV 408 is less than the corresponding previous FV in the table 500 for SCI 5, then the receiving node may reject the message as it is likely to be a replay attack. It is noted that if the table is not large enough store the requisite number of entries, then further matching may be offloaded for software management (e.g., using a hash table).

Figure 6:
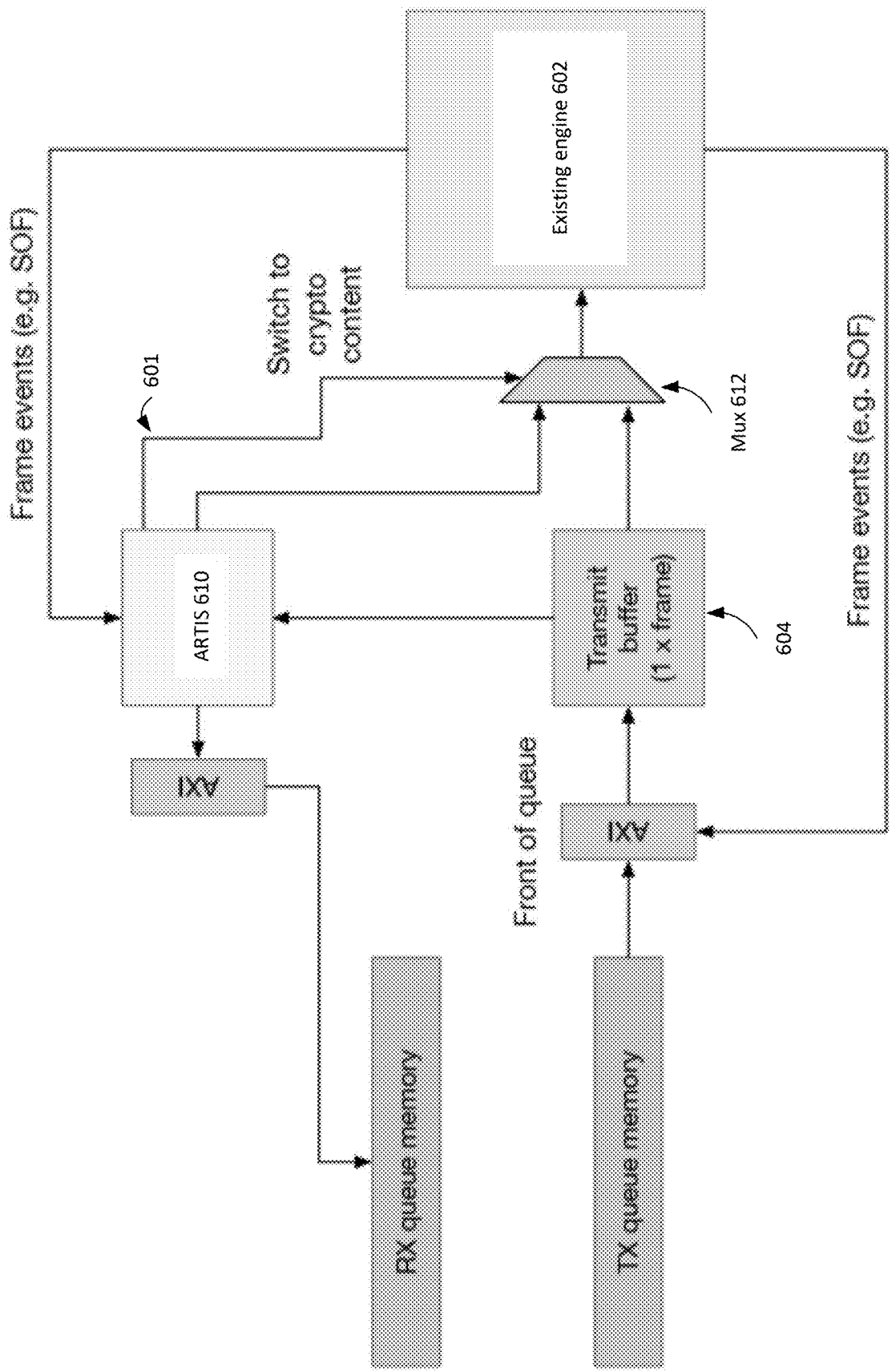
FIG. 6 illustrates an example hardware-based implementation for adapting the secured messaging system with an existing conventional system, in accordance with one or more embodiments of the present disclosure.

FIG. 6 illustrates another hardware-based implementation for adapting the secured messaging system with an existing conventional system, in accordance with one or more embodiments of the present disclosure. The architecture 600 as shown in FIG. 6 demonstrates that the embodiments as described herein are protocol agnostic. That is, the use of the counter value representations within secured messages and the session keys as discussed herein may be implemented independently of an existing architecture and communication protocol. For example, the architecture 600 comprises an existing engine 602, which may comprise any suitable type of conventional communication engine for use with a real-time control system. Some examples of the existing engine 602 may comprise a CANbus engine, an Ethernet protocol engine, etc., as well as any of the communication protocols as discussed herein. Although a single engine is shown in FIG. 6, the architecture 600 may comprise any suitable number of different engines concurrently, e.g. a CANbus engine and an Ethernet engine.

The architecture 600 is implemented an Advanced extensible Interface (AXI) bus architecture by way of example, and also comprises TX and RX plaintext queue memories for buffering transmitted messages that are communicated within the particular system in which the existing engine 602 is implemented. Conventionally, the existing engine 602 controls the AXI coupled to the TX queue memory and the transmit buffer 604. Thus, the existing engine 602 is configured to receive messages from the transmit buffer 604 and to transmit these messages with an unencrypted payload in accordance with any suitable communication protocol, such as those discussed herein for example. Moreover, the existing engine 602 is typically coupled to the AXI and the RX queue memory directly, and thus the existing engine 602 may provide received messages with unencrypted payloads to the RX queue memory for delivery to other nodes in the system.

However, the architecture 600 additionally comprises an accelerated real-time security (ARTIS) engine 610, as well as a multiplexer 612. The ARTIS 610 may be implemented as any suitable dedicated hardware components such as a microcontroller, an application specific integrated circuit (ASIC), a field programmable gate array (FPGA), a system on a chip (SoC), dedicated logic and/or other circuitry, etc. The ARTIS engine 610 is configured to perform any or the functions as discussed herein with respect to the transmitting and receiving nodes, such as e.g. reading the key counter value representation contained in the secure messages, deriving the required session keys, performing encryption, authentication, and decryption, etc. The ARTIS 610 may advantageously be implemented in hardware versus software to eliminate the need for reordering secured messages and to thus minimize latency. This advantageously reduces the window for replay attacks to such a small time period that the risk for replay attacks is essentially eliminated.

The architecture 600 also comprises a multiplexer 612, which is controlled by the ARTIS engine 610 via the control signal 601. Thus, the ARTIS control engine 610 is configured to dynamically change the operation of the system in which it is implemented (e.g. system 300) between an unsecured and a secured messaging operation. For example, the lower path of the mux 612 may be selected to route plaintext data from the transmit buffer 604 to the existing engine 602, and the ARTIS engine 610 may also route the received plaintext data to the RX queue memory in this mode of operation.

However, the upper path of the mux 612 may be selected when operating in a cryptographic mode. In this mode, the plaintext messages are routed from the transmit buffer to the ARTIS engine 610, and are used by the ARTIS engine 610 to generate encrypted payloads that are included as part of the secured messages, as discussed herein. In this mode of operation, the secured messages are also routed to the RX queue memory and distributed to other receiving nodes in the system, but as secured messages (versus unsecured messages that are generated by the existing engine 602). In this way, the architecture 600 allows for concurrent operation of an existing, unsecured messaging system with the secured messaging system embodiments as discussed herein.

F. Example Process Flows

Figure 7A:
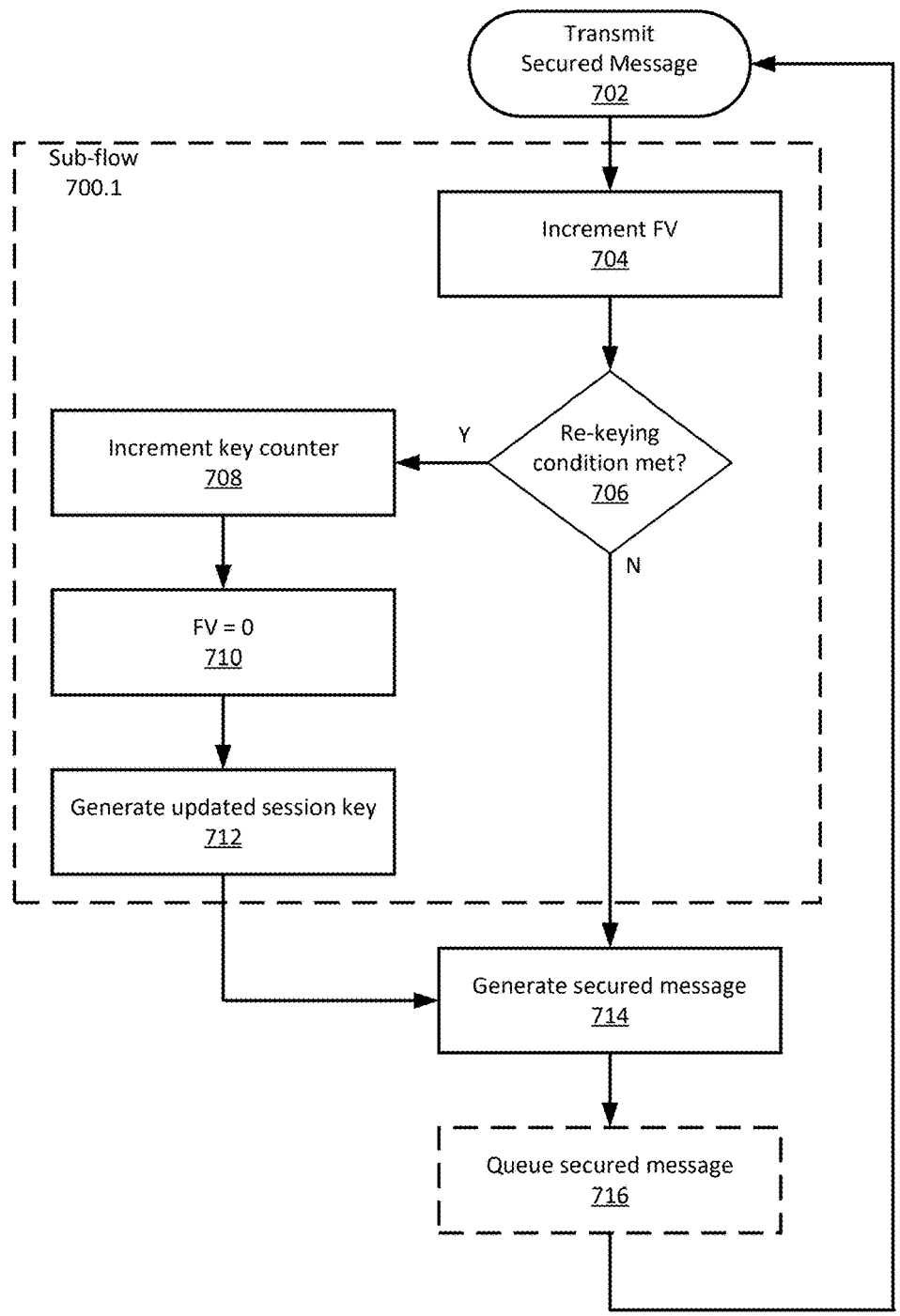
FIGS. 7A and 7B illustrate example process flows, in accordance with an embodiment of the disclosure.
Figure 7B:
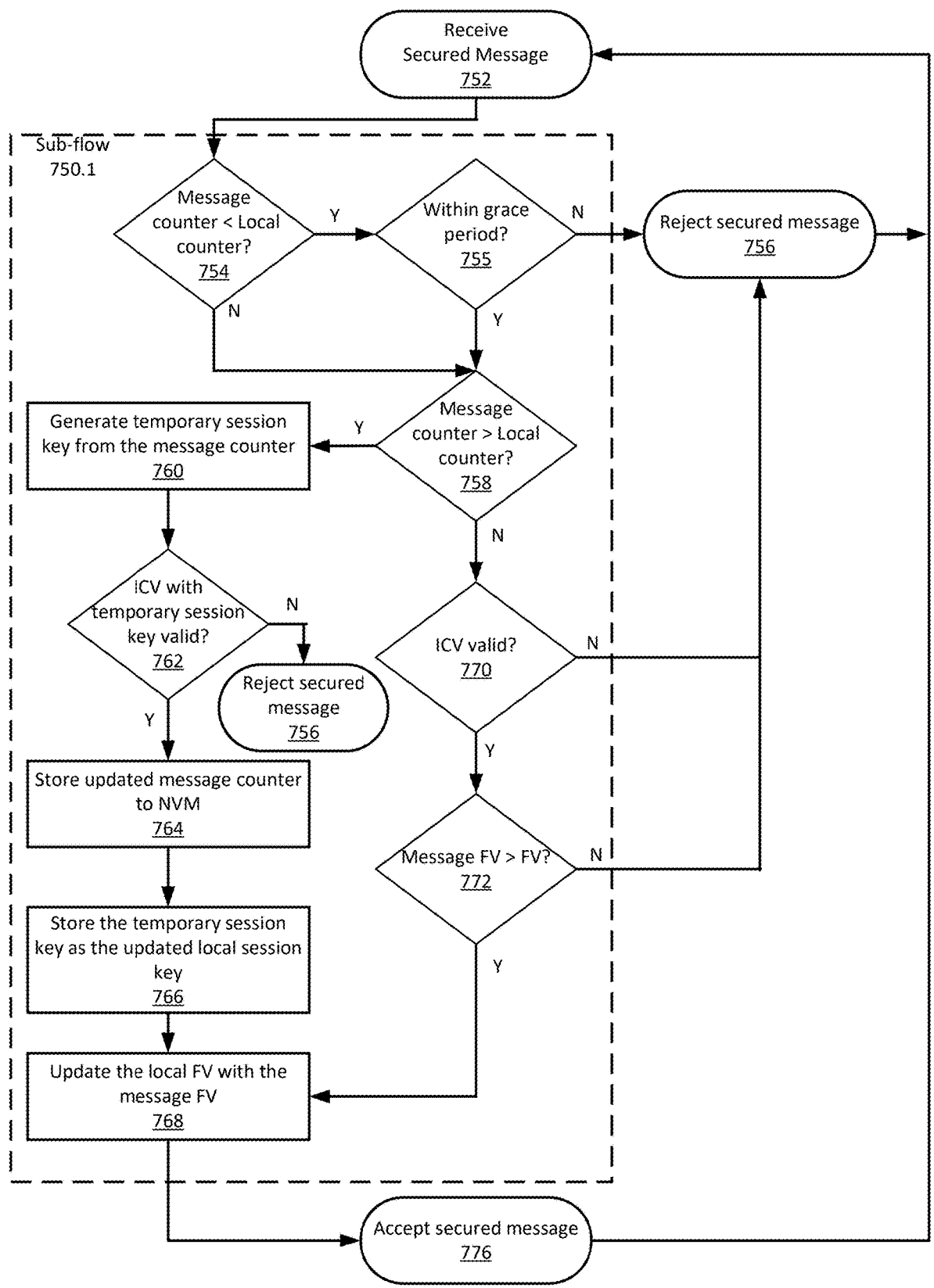

FIGS. 7A and 7B illustrate process flows used by transmitting and receiving nodes to transmit and receive secured encoded message, in accordance with one or more embodiments of the present disclosure. With reference to FIGS. 7A and 7B, the process flows may comprise a method executed by and/or otherwise associated with any suitable number and/or type of components such as one or more processors (processing circuitry), hardware components, executed instructions (e.g., software components) or combinations of these. The components may be associated with one or more components of the node 200 as discussed herein. The flows 700, 750 may include alternate or additional blocks that are not shown in FIGS. 7A and 7B for purposes of brevity, and may be performed in a different order than shown. Moreover, some blocks may be optional.

Specifically, FIG. 7A provides additional detail regarding the process implemented by a transmitting node upon generating and transmitting a secured message. FIG. 7B provides additional detail regarding the process implemented by a receiving node to validate key counter values in a received secured message to accept or reject the secured message.

Referring first to FIG. 7A, the process flow 700 may be implemented via any one of the nodes discussed herein, such as any of the nodes included in the system 300 for example, when performing a secured message transmission. This may include, for example, the node 200 as discussed herein with respect to FIG. 2A.

The process flow 700 begins with the transmission (block 702) of a secured message. The secured message may be formatted in accordance with any suitable communication protocol and include any suitable number of fields, such as the communication frames as discussed herein with respect to FIGS. 4A-4B.

Upon transmitting the secured message, the process flow 700 includes incrementing (block 704) the freshness value via the transmitting node. This may include, for example, the processing circuitry 208.2 incrementing the locally stored freshness value (e.g., FV.A, FV.B, FV.C, etc.) based upon the particular secure zone corresponding to the intended recipient node(s), as shown in FIG. 2A. Thus, the freshness value that is incremented in this way may be correlated to one or more session keys for that particular secure zone, as discussed herein.

The process flow 700 further comprises the transmitting node determining (block 706) whether a re-keying condition has been met. These conditions may include any suitable predetermined conditions that, when met, result in the key counter being incremented, as further discussed herein, assuming that a priority flag, if implemented, is not set. Such conditions may comprise, for example, a number of secured messages being transmitted with a respective session key in excess of a predetermined number of messages, the expiration of a predetermined time period, each system boot, receiving a security alert request, etc.

As one illustrative example regarding session key exhaustion, the determination regarding whether the number of transmitted secured with a respective session key has exceeded a predetermined number of messages may include determining (block 706) whether the current (now incremented) freshness value exceeds a predetermined threshold value. This predetermined threshold value may be selected as any suitable value that triggers a re-keying process due to session key exhaustion, as discussed herein. For example, the threshold freshness value may be several million or several billion.

Thus, if a re-keying condition is met (e.g., the incremented freshness value exceeds the predetermined threshold), then the transmitting node executes (block 708) a local re-keying process of the key counter values. Thus, using the secured zone A from above as an example, which is assumed to be used for the current secured message transmission, this may include the session key generator 202 incrementing (block 708) the key counter A.1 and overwriting the NVM 204 with this new updated key counter value (e.g., a key counter A.1+1, not shown). Moreover, when a re-keying event occurs, the transmitting node may reset its locally stored freshness value, which is transmitted in the next secured message, to its predetermined or default value (e.g. 1), which is then incremented for subsequently transmitted messages as noted herein.

The process flow 700 also comprises resetting (block 710) the freshness value for the secured zone back to a default or initial value, which is 0 in this example. Thus, continuing the previous example, the freshness value FV.A would be reset to 0 (or other suitable initial value).

The process flow 700 further comprises generating (block 712) an updated session key from the incremented key counter value. This may comprise, using the secured zone A as an example, the session key generator 202 computing the session key A.2 from the shared key A and incremented key counter value in accordance with the KDF, as shown in FIG. 2B. The previous session key A.1 as shown in FIG. 2A may then be overwritten with the updated session key A.2 or otherwise invalidated for future secured transmissions. For example, the updated session key A.2 may be stored in the volatile memory 206 in a new location or overwriting the contents of session key A.1.

The process flow 700 may comprise generating (block 714) a secured message. This may include, for example, the processing circuitry 208.2 generating a secured message as discussed herein having any suitable number of fields. The secured message may be generated in this manner using either the original session key (e.g., session key A.1) if the freshness value was determined (block 706) to be less than the threshold value or, alternatively, the updated session key (e.g. session key A.2) may be used when the freshness value was determined (block 706) to be greater than the threshold value, and thus the key counter and session key were updated. In any event, the secured message may be generated using the current session key to encrypt the payload of the secured message, to transmit the secured message as an authentication only message, or to transmit the secured message as both an authentication and encrypted message. Again, the session key may be one of several (e.g. one being used for authentication and another being used for encryption). In such a case, the process flow may 700 may be extended to selectively update any suitable number of session keys corresponding to the same freshness value.

The process flow 700 may comprise queuing (block 716) the generated secured message. This may include, for example, the communication circuitry 208.1 adding the secured message to a queuing buffer for transmission (block 702) in the appropriate order based upon a messaging priority. Alternatively, if a hardware-based solution is implemented as discussed above with respect to FIG. 5, then the use of a queuing buffer may not be needed, and the secured message may be transmitted (block 702) upon being generated (block 714). The process flow 700 may thus be repeated for each secured message transmission via a transmitting node, with the process flow 700 applying to each subsequent secured message transmission.

Referring now to FIG. 7B, the process flow 750 may be implemented via any one of the nodes discussed herein, such as any of the nodes included in the system 300 for example, when receiving a secured message transmission. This may include, for example, the node 200 as discussed herein with respect to FIG. 2A, when functioning as a receiving node.

The process flow 750 begins with receiving (block 752) a secured message. Again, the secured message may be formatted in accordance with any suitable communication protocol and include any suitable number of fields, such as the communication frames as discussed herein with respect to FIGS. 4A-4B.

The process flow 750 further comprises determining (block 754) whether the message counter, e.g. the key counter value represented by the CNT 406 as discussed herein, is less than the locally stored key counter value corresponding to the secured zone to which the secured message was sent and received. This determination may comprise, for example, comparing the representation of the key counter value encoded by the CNT 406 with the locally stored key counter value for the same secured zone. For instance, the CNT 406 may represent a predetermined number of least significant bits of the key counter value used to generate the encoded message by the transmitting node prior to being received. In such a case, then the determination (block 754) may comprise a comparison via the processing circuitry 208.2 between the same corresponding predetermined number of least significant bits of the locally stored key counter value for the current secure zone. Alternatively, if the entire key counter value is represented by the CNT 406, then the determination (block 754) may comprise a comparison via the processing circuitry 208.2 between the entire locally stored key counter value and the entire key counter value represented by CNT 406 for the current secure zone.

In any event, if it is determined that the key counter value derived from the CNT 406 is less than the locally stored key counter value for that secure zone, then the process flow 750 comprises conditionally approving or rejecting the derived key counter value. For example, the process flow 750 comprises a further determination of whether (block 755) the key counter value derived from the CNT 406 is within the predetermined grace period, as noted above. Again, this grace period may represent a time period that has elapsed since the last, different key counter value was received, and may additionally or alternatively be computed based upon the based upon the freshness values associated with the key counter value derived from the CNT 406.

If the key counter value derived from the CNT 406 is outside of this grace period, then the process flow comprises rejecting (block 756) the secured message. That is, in such a case, the receiving node determines that the key counter value represented by the CNT 406 is invalid, and thus rejects the secured message, as this is indicative of a replay attack, a stale message, or a corrupted message.

In the event that the key counter value derived from the CNT 406 is within the grace period (block 755, Y) or the key counter value derived from the CNT 406 is not less than the locally stored key counter value for that secure zone (block 754, N), the process flow 750 continues and comprises another determination (block 758) regarding whether the opposite condition is true, i.e. the key counter value derived from the CNT 406 is greater than the locally stored key counter value for that secure zone. If this is not the case, then this means that the key counter value derived from the CNT 406 matches the locally stored key counter value for that secure zone, and the process flow 750 proceeds accordingly.

However, in the event that the value derived from the CNT 406 is greater than the locally stored key counter value for that secure zone, then the locally stored key counter value is out of date, as noted above. As a result, the leftmost branch of the process flow 750 corresponds to a conditional local (i.e., at the receiving node) re-keying process. That is, the receiving node may update its locally stored key counter value in such a case only when the key counter value that is represented in the CNT 406 is determined to be valid via an additional message verification process.

For example, upon the receiving node determining (block 758, Y) that the locally stored key counter value is out of date, the process flow 750 comprises generating (block 760) a temporary session key. To do so, the receiving node uses the full length key counter value that was used by the transmitting node to generate the secured message that has been received. Thus, in the event that the CNT 406 represents a truncated portion of the full length key counter value used by the transmitting node to generate the secured message, the receiving node may derive the full length of the key counter value via a computational process. For instance, the receiving node (e.g., the processing circuitry 208.2) may concatenate the non-truncated portion (e.g., the upper significant bits) of the locally stored key counter value with the remaining truncated portion of the full length of the key counter value (e.g. the lower significant bits) represented by the CNT 406.

Once the full length of the key counter value is derived from the CNT 406, the process of generating (block 760) the temporary session key is identical to that used to generate the locally stored session key by both the receiving node and the transmitting node. Thus, the receiving node uses the same KDF and other inputs that were (or should have been) used by the transmitting node to generate the temporary session key. Specifically, the full key counter value is used as one of the inputs to the KDF together with the receiving node's locally stored shared key that corresponds to the current secure zone.

In this way, the full length of the key counter value computed in this manner may be validated by using the temporary session key to decrypt the payload of the secured message, compute the ICV value, and then compare the computed ICV value with the ICV 412 contained in the secure message. Thus, the ICVs will only match (block 762, Y) when the key counter value used to generate the secured message is valid. If not (block 762, N), then the process flow 750 comprises the receiving node rejecting (block 756) the secured message.

Therefore, when the ICVs match one another, the receiving node stores (block 764) an updated key counter value in the NVM 204, overwriting the current key counter value such that the locally stored key counter value now matches the valid, full length the key counter value that was derived from the CNT 406. Again, this key counter value was used by the transmitting node to generate the session key and, in turn, used to generate the current secured message. For example, if the receiving node previously stored the key counter A.1 as shown in FIG. 2A, then after this process the receiving node and the transmitting node would both store the key counter A.1+1.

Additionally, the process flow 750 comprises storing (block 766) the temporary session key that was generated (block 760) from the full length key counter value derived from the CNT 406 as described above as the receiving node's updated local session key. For example, if the receiving node previously stored the session key A.1 as shown in FIG. 2A, then after this process the receiving node and the transmitting node would both store the session key A.2, which is generated using the key counter A.1+1, as shown in FIG. 2B.

The process flow 750 further comprises updating (block 768) the local freshness value to match that received in the secure message. For example, if the receiving node previously stored the freshness value FV.A as shown in FIG. 2A, then after this process the receiving node and the transmitting node would both store the freshness value FV.A+1. Additionally, the receiving node may update the received FV log 206.1 as shown in FIG. 2C to store the FV from the secured message A.2 correlated with the key counter value and secure zone, as noted above.

The process flow 750 further comprises accepting the secured message as the final step in the process, as the key counter value has been validated and the freshness value updated as a result of the local re-keying process.

As noted above, when the receiving node determines (block 758, N) that the key counter value derived from the CNT 406 matches the locally stored key counter value for that secure zone, then the process flow 750 proceeds accordingly. This includes the validation of the key counter value derived from the CNT 406 based upon a comparison of ICVs. Specifically, the receiving node may generate the session key from the key counter value derived from the CNT 406 or, alternatively, use the locally stored session key to decrypt the payload contents, compute the ICV, and then determine (block 770) whether the ICVs match one another. Again, if not, then the secured message is rejected.

Otherwise, the process flow continues to determine (block 772) whether the freshness value contained in the secured message is greater than the locally stored freshness value for the transmitting node and the secure zone, e.g. as shown in the log of FVs in FIG. 2C. If so, then the receiving node rejects the secured message. If not, then the process flow includes updating (block 768) the locally stored FV with the FV contained in the secured message, as discussed above, and accepting (block 776) the secured message. The process flow 750 may thus be repeated for each secured message that is received via a receiving node, with the process flow 750 applying to each subsequent secured message that is received.

II. Secure Communications Leveraging Live Membership Groups

Again, replay attacks may include both strong and weak types. As discussed in Section I above, strong replay attacks may include a node receiving a message once legitimately (i.e. accepting a validated secured message), and then accepting another, maliciously-generated secured message at a subsequent time from an attacker. Such strong replay attacks may, for example, allow an attacker to store a previously-sent "disable immobilizer" secured message and then send this same message at a later time. The use of the real-time bus key distribution system described in Section I aims to eliminate or at least significantly reduce the possibility of such strong replay attacks.

However, the present Section provides additional embodiments that may be used in addition to and/or in combination with those described above in Section I as an added security measure against weak replay attacks. Weak replay attacks are associated with techniques that aim to disconnect or otherwise force a node offline for a period of time to exploit a lack of this knowledge by other nodes. For instance, a weak replay attack may be performed by partitioning the bus in a system used for secured communications. As a result, a targeted node then fails to receive the originally transmitted secured message from other nodes, and instead subsequently receives the secured message when brought back online at a later time that is useful to an attacker. For example, in a real-time control system used in an automotive environment, a node may not receive a transmitted secured "unlock door" message, and instead receive this same message when an attacker forwards the message to unlock the door while driving.

Weak replay attacks provide specific security issues with respect to a disconnected node that has been reset. For instance, and as described above with respect to FIG. 7B, upon coming back online after a reset, a receiving node will accept secured messages from other nodes with a key counter value that is greater than the receiving node's locally-stored key counter value. This allows an attacker to initiate a weak replay attack by partitioning the network, resetting a node, and then replaying old secured traffic from other nodes. The embodiments described in this Section address this issue through the use of live membership groups. Specifically, the embodiments described in this Section augment the real-time bus key distribution system described in Section I to discover which nodes are currently online, i.e. "live." A reset node can thus refuse to accept secured messages from non-members or from members in the same group that have not verified their online status, even if a secured message would otherwise have been accepted in accordance, for example, with the process flow 750 as described in Section I above with respect to FIG. 7B.

The membership groups as discussed herein may comprise any suitable number of nodes within the system of interconnected nodes as described above in Section I. This may include, for example, the entirety of the system of interconnected nodes 300 as shown and discussed above with respect to FIG. 3. Alternatively, the membership groups may comprise a smaller subset of the system of interconnected nodes 300. Thus, the system of interconnected nodes 300 may comprise any suitable number of membership groups, each having any suitable number of nodes as part of their respective membership groups. The membership groups may comprise nodes that overlap with other membership groups, such as the secure zones as discussed above. Thus, the membership groups may be defined in accordance with any suitable grouping of nodes, which may be the same or different than the secure zones as discussed herein. When the membership groups are different than the secure zones, the membership groups and the secure zones may concurrently form part of the system of interconnected nodes 300. In any event, the membership groups as discussed herein may be predetermined with respect to the system of interconnected nodes 300, and thus each node 200 as described herein may be configured to operate using this information, which is further disused below.

A. Live Membership Secured Message Format

Figure 8:
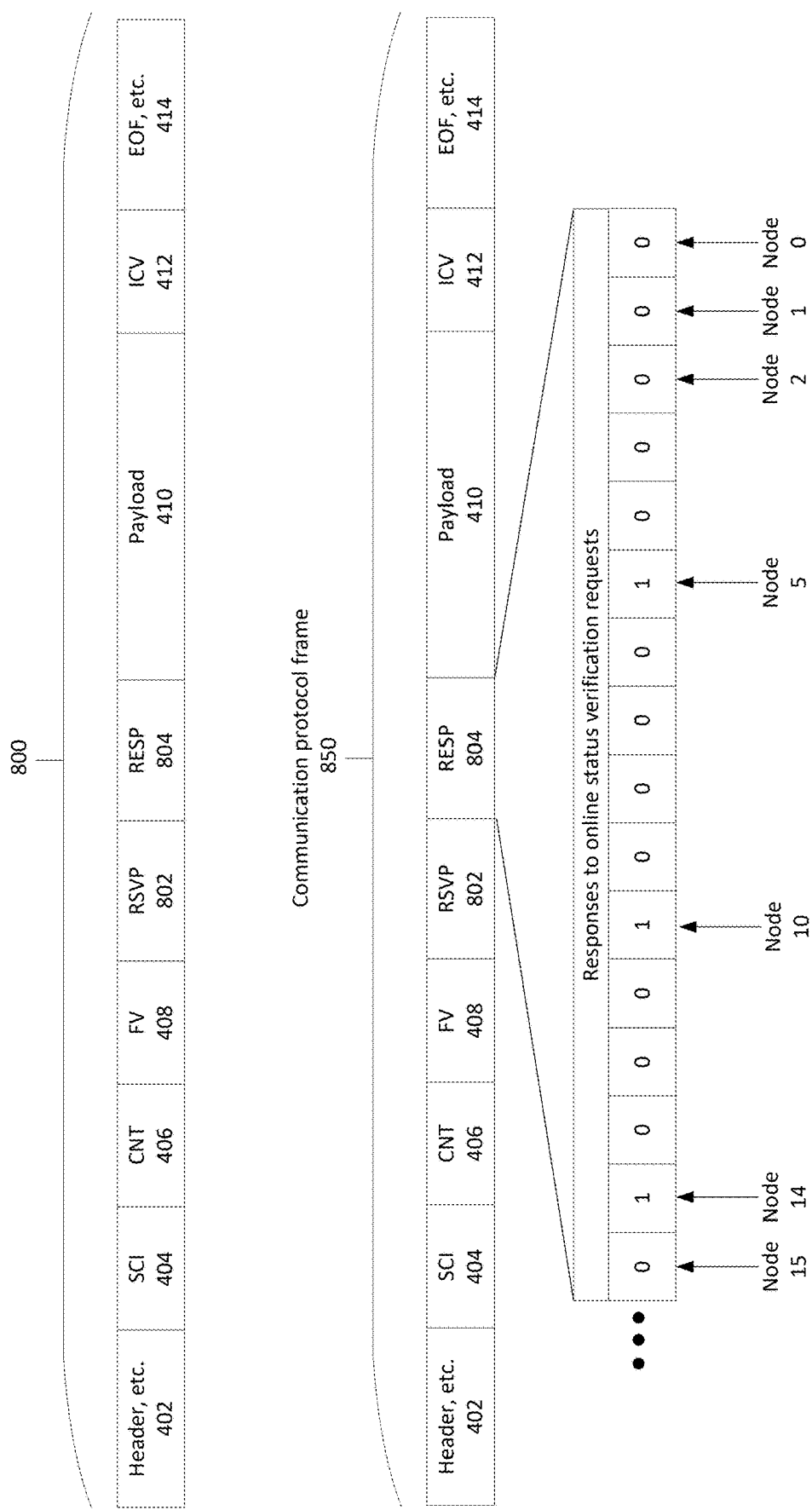
FIG. 8 illustrates example formats of secured messages used to request and respond to online status verification requests, in accordance with one or more embodiments of the disclosure.

FIG. 8 illustrates example formats of secured messages used to request and respond to online status verification requests, in accordance with one or more embodiments of the disclosure. The secured message formats as shown in FIG. 8 may correspond to secured messages that are transmitted and received in accordance with any suitable communication protocol, and may constitute communication protocol frames comprising any suitable number of fields. The communication protocol frames 800, 850 may comprise several fields that are also included in the communication protocol frames 400, 450 as shown and discussed above with respect to FIGS. 4A and 4B. Thus, and as noted above in Section I, the communication protocol frames 800, 850 may also be identified with any suitable type of communication protocol that may be implemented to facilitate the communication of secured messages via a multi-drop or point-to-point bus architecture.

The communication protocol frame 800 may, for example, correspond to a communication frame identified with a secure message that is initially transmitted via the node 200 when acting as a transmitting node. Thus, to support the use of live membership as discussed in accordance with the embodiments provided in this Section, the processing circuitry 208.2 is configured to generate the communication protocol frame 800, which is transmitted via the communication circuitry 208.1 as noted in Section I above. In the context of membership groups as discussed in this Section, a node that is requesting online verification from other nodes may alternatively be referred to herein as a "challenging" node, and a request for online verification may be alternatively referred to herein as a "challenge request" or simply as a "challenge." Additionally, any node that receives a secured message including an online verification request from other nodes and then responds to this request may be alternatively be referred to as a "responding" node. It is further noted that although the concepts of challenging and responding nodes is separated herein for purposes of brevity and ease of explanation, a node may function as both a challenging node and responding node simultaneously. The interaction between challenging and responding nodes, as well as their functions, are further discussed below.

It is noted that embodiments described in this Section exploit the use of typical traffic that occurs with the system of interconnected nodes. That is, the embodiments described in this Section may implement the use of additional information that is encoded and added to the secured messages as discussed in Section I above to both request online verification from other nodes as well as respond to such requests. Thus, requests for online verification (i.e. challenges) as well as responses to such requests may occur by way of the ordinary transmission of secured messages among nodes. This advantageously allows for the online status of nodes to be verified without the use of specialized messages such that the challenges and responses thereto do not place a burden on communication bandwidth.

To do so, the communication protocol frame 800 includes an RSVP field 802 as shown, which comprises a representation of a query value. The query value may thus be represented as any suitable encoded value that indicates whether a node is requesting an online status verification from any other nodes within a membership group. It is noted that the query value may be encoded by any node in the membership group in an indiscriminate manner, i.e. a challenge request using the query value may leverage a secured message that is transmitted to multiple interconnected nodes, for example via the multi-drop scheme as discussed herein.

For example, the query value may comprise different predetermined values depending upon whether a node is requesting an online verification from other nodes in the same membership group. That is, the query value may be identified with a default predetermined value that represents a node not requesting an online verification request. Alternatively, the contents of the RSVP field 802 may not be populated in such a case and/or the RSVP field 802 may not be included in the communication protocol frame 800 when no online verification request is being made. Thus, when a node is requesting an online verification request from other nodes, the query value may comprise a predetermined value that is recognized by other receiving nodes in the membership group.

To provide an illustrative example, the query value may comprise any suitable encoded value that uniquely identifies the transmitting node that is requesting an online verification request from other nodes. This unique identification value may comprise any suitable value that is known by the other nodes in the membership group via an initial configuration and setup process. For instance, if the node 200 is identified as node 5, the query value may represent an encoded representation of '5' when the node 200 is requesting an online verification request from other nodes, and may otherwise be set to '0.'

To provide another illustrative example, the RSVP field 802 may contain a one-bit binary value that is set to one value (e.g. 1) when a challenging node is requesting online verification from other nodes, and is otherwise set to a different value (e.g. 0). Thus, the query value need not identify the challenging node, but instead may simply identify that the challenging node is requesting an online verification request from other nodes. In such a case, each responding node may determine the identity of the node 200 from which the secured message was received in any suitable manner. This identification may be performed, for example, via the identification of data that may be contained in other fields of the communication protocol frame 800 that are populated via the node 200 when transmitting each secured message in accordance with the particular communication protocol that is used.

Thus, it is further noted that although the communication protocol frames 800, 850 are shown in FIG. 8 using a dedicated RSVP field 802 to provide the representation of the query value, this is by way of example and not limitation. In other embodiments, the representation of the query value may be contained in an alternate field of the communication protocol frames 800, 850, such that the dedicated RSVP field 802 is not needed. For example, the representation of the query value may be contained in part of the header 452 or form part of the payload 410.

The communication protocol frames 800, 850 also comprise a response (RESP) field 804, which is populated by a responding node in a subsequently-transmitted secured message. The RESP field 804 may comprise encoded data that represents any suitable indication of whether a node in the membership group has affirmatively responded to a request for online status verification transmitted from other challenging nodes. As noted above for the RSVP field 802, the encoded data contained in the RESP field 804 as shown in FIG. 8 may be contained in an alternate field of the communication protocol frames 800, 850, such that the dedicated RESP field 804 is not needed. For example, the encoded data contained in the RESP field 804 may be contained in part of the header 452 or form part of the payload 410.

The RESP field 804 may include, for instance, comprise any suitable type of mapping that uniquely identifies each node in the membership group. For example, and with reference to FIG. 8, a membership group may comprise 16 nodes within the system of interconnected nodes 300. Each of these 16 nodes may be uniquely identified in any suitable manner, which is known by the other nodes, as noted above. The RESP field 804 may thus comprise a bit string (e.g. an array of bits), with the position of each bit in the bit string corresponding to each respective node in the membership group. In other words, each bit in the bit string is identified with a different node in the membership group by way of a respective predetermined bit position within the bit string. For the example communication protocol frame 850 as shown in FIG. 8, the rightmost bit position corresponds to node 0, and the leftmost corresponds to node 15.

Thus, each bit position in the RESP field 804 corresponds to a value that indicates whether each respective node has affirmatively responded to a request for online status verification from one or more other nodes in the membership group. The predetermined bit position of the RESP field thus corresponds to each of the nodes that have requested online status verification. Thus, each node in the membership group that receives an online status request from other nodes may set the bit value for the bit position that is associated with each respective challenging node to a different predetermined value (e.g. '1'). In this way, the value of each bit in the RESP field 804 is based upon a value that is set by each node in response to a challenge request by any other node in the membership group. Therefore, and with continued reference to FIG. 8, the communication protocol frame 850 indicates that nodes 5, 10, and 14 have requested online verification from each node in the membership group.

To populate the RESP field 804, each node in the membership group may maintain a log of online verification requests received from other nodes. For example, the node 200 may comprise an online verification request log 207 as part of the volatile memory 206 as shown in FIG. 2A or, alternatively, as part of the non-volatile memory 204 (not shown). Thus, each responding node may store in the online verification request log 207 a bit string or other suitable set of encoded values that correspond to the RESP field 804. For example, the online verification request log 207 may store a bit string identical to the RESP field 804, with each bit position in the locally-stored bit string corresponding to an indication regarding whether each node in the membership group has requested an online verification request. Again, this is determined by way of the representation of the query value contained in the secured message transmitted by each node (e.g. via the RSVP field 802).

Again, and using the convention as shown in the example for FIG. 8, it is assumed that a node has received an online verification request via secured messages received from each of the identified nodes 5, 10, and 14. These secured messages may be received over a period of time, and thus the processing circuitry 208.1 may update the contents of locally stored online verification request log 207 as each secured message is received. The number of secured messages that may be received in this manner until the next scheduled secured message is generated with the populated RESP field 804 may be any threshold number of secured messages based upon the configuration, available bandwidth, number of nodes in the membership group, etc. In any event, for each secured message that is received having a representation of the query value that indicates a challenge request was made (e.g. via the RSVP field 802), the processing circuitry 208.1 accumulates the contents of the locally stored online verification request log 207 to represent each of these outstanding requests.

Therefore, prior to a node populating the RESP field 804 in response to these online verification requests, the local bit string stored in the online verification request log 207 may comprise the same contents of the RESP field 804 as shown in FIG. 8. As a result, when a node in the membership group transmits the secured message to respond to outstanding challenges, the node copies (e.g. via the processing circuitry 208.2) the contents of the online verification request log 207 into the RESP field 804 as shown in FIG. 8. Moreover, once the secured message is transmitted with this populated RESP field 804, the responding node is configured (e.g. via the processing circuitry 208.2) to reset the contents of its locally stored online verification request log 207 to a predetermined initial state. This predetermined state may comprise one that indicates that no online verification requests are currently pending from other nodes. For example, the locally stored online verification request log 207 may be reset to store a bit string of all zeroes. Therefore, and continuing the present example, when there are no outstanding challenge requests for online status verification, each node in the membership group may transmit its respective RESP field having all zeroes, i.e. the current contents of the locally stored online verification request log 207.

Again, each node in the membership group may operate in the same manner as the node 200 as described above with respect to FIG. 2A. To provide an illustrative example with respect to the communication protocol frame 850, the node 200 may receive several secured messages over time. From these secured messages, challenge requests for online verification are received from nodes 5, 10, and 14 via respective secured messages. Thus, the node 200 may receive the secured messages in any suitable manner (e.g. via a bus such as the multi-drop bus described above) via the communication circuitry 208.1, with the secured messages then being processed as discussed in further detail herein via the processing circuitry 208.1 to accept or reject the secured messages.

Thus, although a single responding node may be used as an example throughout this Section for ease of explanation, it is noted that each node receiving a challenge message may individually respond to such requests. Although termed as "responding," it is understood in this context that each responding node need not transmit a dedicated secured message in response to such requests. Instead, each responding node may populate its own RESP field 804 as part of the next scheduled secured message that is to be transmitted. Again, to provide the contents of the RESP field 804, each node may modify the contents of its locally stored online verification request log 207 (e.g. via the processing circuitry 208.2) as additional secured messages are received. Thus, the contents of the online verification request log 207 at any particular time indicates which nodes have requested an online verification request that are currently outstanding (i.e. awaiting a response via the population of the RESP field 804 in a transmitted secured message).

Thus, and continuing the present example, each responding node may populate the RESP field 804 when generating the next scheduled secured message, which is transmitted to and received by each of the nodes in the membership group, including the nodes 5, 10, and 14. In this way, the secured message itself is not generated in response to receiving online verification requests via several secured messages. Rather, the RESP field 804 is populated as part of the generation of the next scheduled secured message to be transmitted in response to receiving online verification requests from one or more challenging nodes. In this way, a responding node may simultaneously respond to a challenge request from any number of nodes (e.g. all nodes) in the membership group from which an online verification request was received via a single transmitted secured message. By using the existing secure message scheduling architecture and not requiring dedicated messages to be sent in this manner, the speed in which nodes may respond to online verification requests is significantly fast (e.g. a few hundred microseconds such as 100, 200, 300 microseconds, etc.), particularly for hardware implementations such as those discussed above in Section I. Further leveraging this advantage, for the live membership embodiments described in this Section, all responding nodes may respond to a challenge no later than their shortest period frame time+its latency (typically <20 ms). This advantageously allows for the detection of offline nodes extremely quickly, which is particularly useful for real time control systems and other safety critical systems such as those used in automotive applications.

And because each responding node only responds to an online verification request via the populated RESP field 804 if that node is online, the RESP field 804 in each secured message that is received via a challenging node allows for an inference (i.e. a determination) by the challenging node of the online status of each responding node within the membership group. To provide an illustrative example, if secured messages containing the RESP field 804 are lost, then the requesting node (i.e. the node that issued the challenge request) will need to re-request the online status verification to confirm an offline status. For the CAN XL protocol, messages are not lost by default (i.e. the protocol itself will retransmit messages corrupted by noise). For an Ethernet-based system, a requester may infer that a node is offline if a threshold number of challenge requests (e.g. two, three, etc.) go unanswered.

However, in addition to the inference of a node being online as noted above, a node requesting online verification from other nodes may implement an additional verification based upon the contents of the RESP field 804. For example, once a secured message is transmitted including the contents of the RESP field 804, each node in the membership group receives the secured message, which includes nodes that requested an online verification request as well as nodes that did not. Thus, each node that requested the online verification request (e.g. nodes 5, 10, and 14 using the example above) may then determine whether each node in the membership group has affirmatively responded to these requests via the contents of the RESP field 804 populated by each responding node.

To provide an example, the communication circuitry 208.1 of node 200 is configured to receive secured messages from each node in the membership group having a populated RESP field 804 based upon the previous online status verification requests. The receiving node (previously a challenging node) may then determine whether each node in the membership group that responded to a previous verification request is online based upon the contents of the RESP field 804. For example, and continuing the example provided above, node 5 may compare the contents of the bit at the node 5 position to a predetermined value (e.g. the bit value of 1) to determine whether a responding node in the membership group has correctly identified its online status in response to the request. Continuing this example, if, after transmitting a secured message requesting online verification, a node in the membership group responds with a secured message including a '1' in this bit position in the RESP field 804, then node 5 would determine that this node is online and active. Otherwise, node 5 would determine that the responding node is in fact not online and is either malfunctioning or the message is being sent by a non-authentic source such as an attacker attempting a weak replay attack. Alternatively, node 5 may determine that the secured message with the challenge request was lost/corrupted or the secured message with the responding node's response was lost/corrupted (however, with CAN XL, as noted above, this generally does not occur).

The comparison of the contents of the RESP field 804 may be performed in any suitable manner, which may comprise a software-based implementation via the processing circuitry 208.2 (or other suitable processor(s)) executing instructions in the program memory 208.3 (or other suitable memory). However, given the example of the single-bit encoding format of the RESP field 804, it may be particularly advantageous to compare the contents of the RESP field 804 using a hardware-based solution such as logic gates, for example, and/or any other suitable hardware to determine an online status indication of responding nodes. Such hardware may, for example, be implemented as part of the communication circuitry 208.1, the processing circuitry 208.2, etc.

It is further noted that each node in the membership group may function in this manner, i.e. by sending requests for online verification to other nodes via the representation of the query value, responding to these requests using the RESP field 804, and verifying whether each node is online based upon the contents of the RESP field 804. For example, each challenging node in the membership group may determine whether other nodes within the membership group are online. This is facilitated via the challenging node (e.g. via the processing circuitry 208.2) determining, for each secured message that is received, whether a bit in the bit string corresponds to the predetermined bit position for the challenging node. The challenging node thus verifies whether a responding node is online based upon whether the value of this predetermined bit position properly indicates that the challenging node had previously requested the online status verification. In this way, the encoded value of the predetermined bit position for the challenging node may represent a value (e.g. '1') that indicates an affirmative response by each responding node to the previous online status verification request.

In any event, each node in the membership group may accept or reject a secured message based upon the response to a previously-transmitted online status verification request. Again, such a response may comprise the populated contents of the RESP field 804. Thus, the decision to accept a secured message may be based upon the inferred online status of a node that has transmitted a secured message with the contents populated in response to an online status verification request as noted above. Alternatively, the decision to accept a secured message may be based upon the online status of a node that is determined via the populated contents of a specific bit or other suitable mapping in the RESP field 804 that indicates that the challenging node previously sent an online status verification request. In this way, each node in the membership group may determine whether to accept secured messages based upon a determination of whether each respective responding node is online. This conditional acceptance of secured messages in this manner is discussed in further detail below with respect to FIG. 9B.

Regardless of the manner in which an online status of other nodes is determined, embodiments include the node 200 maintaining a log of the online status of other nodes in the membership group in any suitable manner. For instance, each node in the membership group may maintain an online status log with respect to other nodes in the membership group. To do so, the node 200 may comprise an online status log 209 as part of the volatile memory 206 as shown in FIG. 2A or, alternatively, as part of the non-volatile memory 204 (not shown). Thus, each node in the membership group may store in the online status log 209 a bit string or other suitable set of values that are mapped to the current online status of each node in the membership group at a particular time. For example, the online status log 209 may store a bit string similar to the online verification request log 207, with each bit position in the locally-stored bit string corresponding to an indication regarding whether each node in the membership group is currently online (e.g. a '1') or offline (e.g. a '0').

In an embodiment, each node in the membership group is configured (e.g. via the processing circuitry 208.2) to determine the current online status of each node in the membership group based upon any suitable number of received secured messages. For example, as each secured messages are received from each of the responding nodes, an online status determination may be made on the basis of each secured message that is received. This determination may include, for example, an accumulation of bit values received from each responding node that corresponds to the contents of the RESP field. To provide an illustrative example, node 5 may transmit a secured message that requests online verification from each node in the membership group via the contents of the RSVP field 802. Each of the other 15 nodes in the membership group may then transmit secured messages including populated contents of the RESP field 804 that include bit 5 in the RESP field as shown in FIG. 8 (and possibly additional bits) being set to a value of '1', which represents an affirmative response to node 5's online challenge request. As each of these secured messages are received from the other nodes, node 5 may thus accumulate the bit values from the same predetermined bit position in the RESP field 804 corresponding to node 5 in each secured message. As the bit values are accumulated in this way, they are then mapped to a predetermined bit position corresponding to each node within the online status log 209. Thus, as each of the other 15 nodes are determined to be online, the online status log 209 contains a bit value equal to '1' at a predetermined bit location corresponding to each of the other 15 nodes. In this way, the contents of the online status log 209 node corresponds to an accumulation of bit values from the RESP field 804 in a number of received secured messages.

Additionally, embodiments include the value of each bit in the online status log 209 being reset to a predetermined value in response to any suitable conditions being met. For instance, the bit values of the online status log 209 may be reset periodically or when a number of secured messages are rejected exceeding a threshold number. To provide another example, the bit values of the online status log 209 may be reset after a threshold time period has elapsed since the bit value of one or more nodes has been updated. In this way, the online status of each node in the membership group may be maintained via the contents of the online status log 209. Once a bit value of the online status log 209 is reset in this manner, a node in the membership group may then perform another request for online verification from nodes in the membership group via another transmitted secured message by populating the RSVP field 802 as noted above. To provide an illustrative example, a node may issue another request for an online verification challenge part-way through the reset period, so that there would be a continuous "online" status that is being refreshed periodically. In this way, the online status may be used to accept/reject messages to prevent a gap in the status resulting in dropped secured messages.

Moreover, it is noted that online status verification requests may be particularly useful when a challenging node is reset and comes back online, although the embodiments are not limited to this particular scenario. The online status verification requests may be sent at any suitable time from any of the nodes within the membership group, which may for example be triggered in response to one or more conditions being met. For instance, an online node in the membership group may periodically (e.g. every 100 ms, every 500 ms, etc.) transmit online status verification requests to determine the status of the bus and/or other nodes in the membership group.

This may be particularly useful, for example, as a diagnostic tool. For instance, if no nodes respond to a challenge, then a challenging node may determine that no other nodes in the membership group are currently online and/or the transmitted secured message with the challenge went missing. Moreover, if a specific node in the membership group does not respond via a lack of an affirmative response in the RESP field 804, then a determination may be made that the node is offline or its response went missing. Additionally, if traffic is still observed from nodes that are identified as being offline, then those nodes are likely being spoofed using replayed traffic.

Again, the use of the live membership embodiments as discussed in this Section may implement any of the communication protocols as noted above in Section I. However, the live membership embodiments as discussed in this Section may provide particular advantages when used in accordance with Ethernet or Ethernet-based protocols. This is because the CAN XL provides atomicity, and thus if a frame is marked as sent, every online node successfully received the frame. Atomicity thus makes detecting offline nodes much easier because challenges do not go missing. However, it is noted that the Ethernet protocols do not provide atomicity in this regard, and thus frames are routinely discarded. As a result, management algorithms need to handle the missing frames, which are typically resent. The live membership embodiments described in this Section advantageously allow for Ethernet implementations that eliminate or reduce the complexity of such management algorithms by verifying the online status of other nodes in a membership group and maintaining a status log of this information.

B. Live Membership Process Flows

Figure 9A:
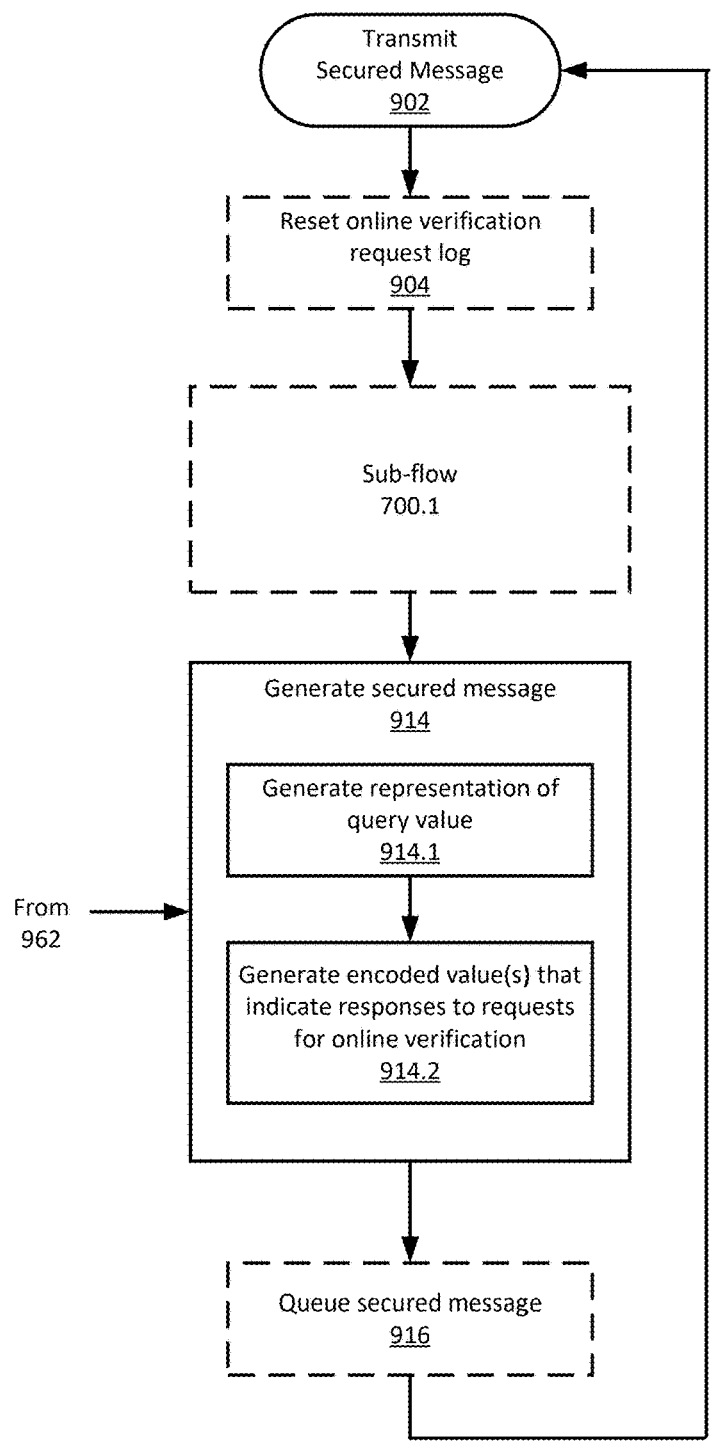
FIGS. 9A and 9B illustrate example process flows, in accordance with an embodiment of the disclosure.
Figure 9B:
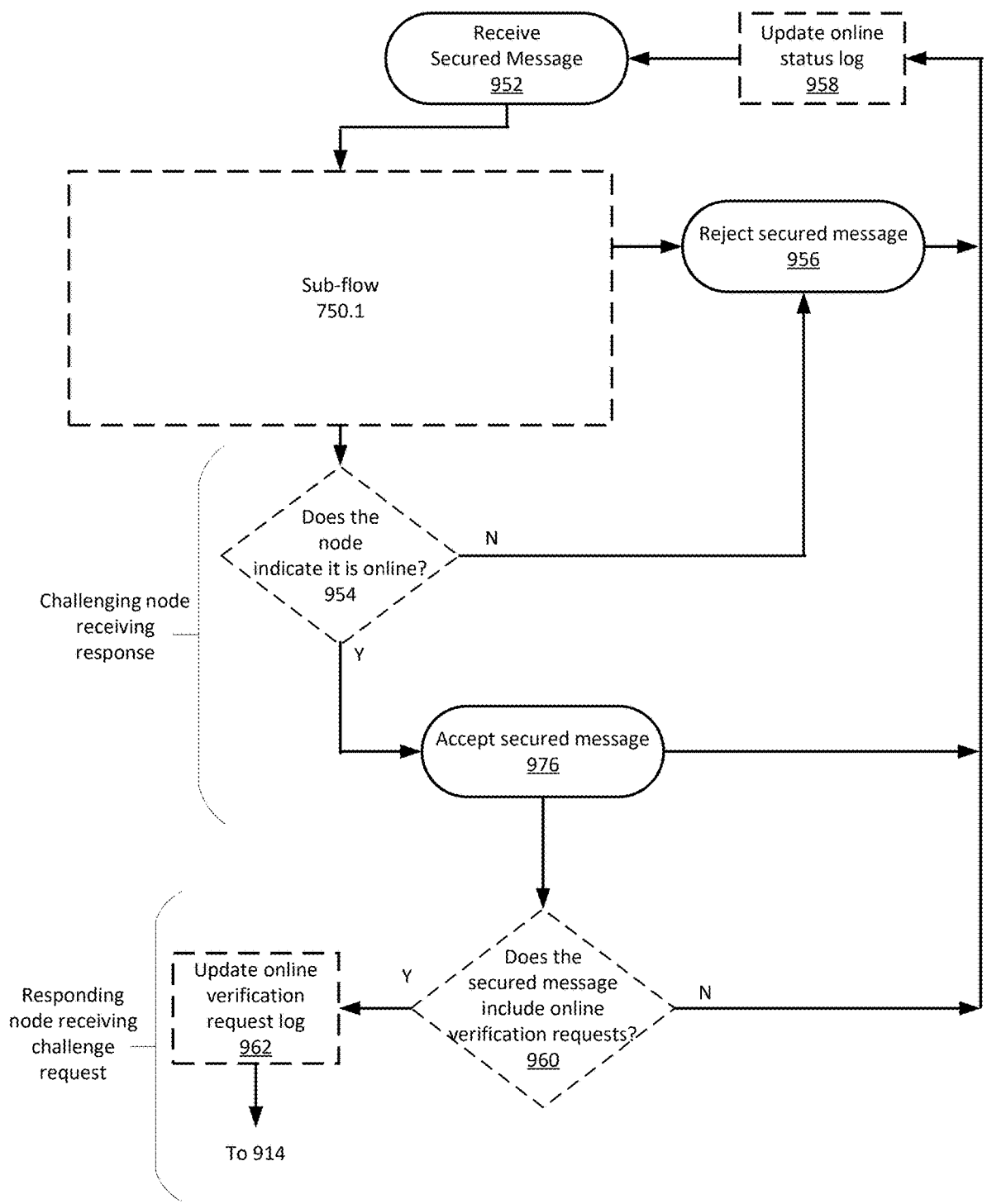

FIGS. 9A-9B illustrates process flows used by nodes to transmit and receive secured messages, in accordance with one or more embodiments of the present disclosure. With reference to FIGS. 9A-9B, the process flows may comprise methods executed by and/or otherwise associated with any suitable number and/or type of components such as one or more processors (processing circuitry), hardware components, executed instructions (e.g., software components) or combinations of these. The components may be associated with one or more components of the node 200 as discussed herein, and may represent software-based implementations, hardware-based implementations, or combinations of these.

Specifically, FIG. 9A provides additional detail regarding the process implemented by a node for generating and transmitting a secured message. FIG. 9B provides additional detail regarding the process implemented by a node to accept or reject a received secured message and, when applicable, to respond to challenge requests. It is noted that the process flow 900 may be identified with the transmission of a secured message via a challenging node or a responding node or, alternatively, a node may function simultaneously as both a challenging node and a responding node.

Moreover, the process flow 950 may be identified with receiving and optionally transmitting a secured message by a challenging node or a responding node. Again, in either case a node may function simultaneously as both a challenging node and a responding node. For example, a challenging node may later receive a secured message from a responding node such that the process flow 950 is with respect to receiving a secured message from a node responding to the previous challenge request. Thus, the flows 900, 950 may include alternate or additional blocks that are not shown in FIGS. 9A and 9B for purposes of brevity, and may be performed in a different order than shown. Moreover, some blocks may be optional depending upon the particular function of a node at a particular time.

Referring first to FIG. 9A, the process flow 900 may be implemented via any one of the nodes discussed herein, such as any of the nodes included in the system 300 for example, when performing a secured message transmission. This may include, for example, the node 200 as discussed herein with respect to FIG. 2A. The process flow 900 may include several blocks that are executed in the same manner as the process flow 700 as discussed above in Section I with respect to FIG. 7A. For purposes of brevity, these common blocks are represented by the sub-flow 700.1 block as shown in FIGS. 7A and 9A. Thus, the process flow 900 illustrates that a node may transmit (block 902) a secured message using a process that is part of the sub-flow 700.1. Moreover, the blocks 902, 914, and 916 are considered analogous blocks with respect to the blocks 702, 714, and 716, respectively. Therefore, the functionality of the blocks 902, 914, and 916 may be the same as or substantially similar to that previously described with respect to blocks 702, 714, and 716, respectively. For purposes of brevity, only differences between these functional blocks is discussed in further detail.

As shown in FIG. 9A, both arrows exiting the sub-flow 700.1 as shown in FIG. 7A are merged into a single arrow for ease of explanation. Thus, the secured message is still generated (block 914) for process flow 900 based upon the same conditions of the sub-flow 700.1 as shown in FIG. 7A. However, the process flow 900 includes additional blocks 914.1, 914.2, which are identified with the generation (block 914) of the secured message.

For example, the generation (block 914) of the secured message as shown in FIG. 9A comprises the generation (block 914.1) of a representation of a query value. As discussed above, this may comprise any suitable query value that indicates whether the node is requesting an online verification request from other nodes in the membership group. For example, the representation of a query value may comprise a binary value or an encoded value that identifies the node, which may form part of the RSVP field 802 as discussed above.

The generation (block 914) of the secured message as shown in FIG. 9A also comprises the generation (block 914.2) of one or more encoded values that indicate (when set) responses to current requests (i.e. challenges) for online verification from any other nodes in the membership group. Thus, although not shown in FIG. 9A for ease of explanation, the node may, prior to transmitting (block 902) the secured message with its own challenge requests, have received secured messages from other nodes challenging the node with their own challenge requests. Again, and as discussed above, the encoded values provided in the secured message may comprise any suitable values that are set by the (currently transmitting) node and represent an affirmative response to each outstanding challenge request that has been received from other nodes in the membership group. For instance, the generation (block 914.2) of one or more encoded values may comprise populating the RESP field 804 in response to these online verification requests, as discussed above. The RESP field 804 may be populated, for example, via the node copying the contents of the local online verification request log 207 to the RESP field 804, as noted herein.

Once the secured message is generated (block 914), the secured message may be queued (block 916) and transmitted (block 902) to the bus for example, as noted herein. After the secured message is transmitted (block 902), the node may then reset (block 904) the contents of the local online verification request log 207 to a predetermined state (e.g. all zeroes), which will remain in this state until additional challenges are received prior to transmitting (block 902) the next secured message. However, it is noted that the resetting (block 904) the contents of the local online verification request log 207 is optional, in that this will not occur in the event that the node is not responding to any outstanding challenge requests via the population of the RESP field 804.

Turning now to FIG. 9B, the process flow 950 may be implemented via any one of the nodes discussed herein, such as any of the nodes included in the system 300 for example, when receiving a secured message. This may include, for example, the node 200 as discussed herein with respect to FIG. 2A. The process flow 950 may include several blocks that are executed in the same manner as the process flow 750 as discussed above in Section I with respect to FIG. 7B. For purposes of brevity, these common blocks are represented by the sub-flow 750.1 block as shown in FIGS. 7B and 9B. Thus, the process flow 950 illustrates that a node may receive (block 952) a secured message using a process that incorporates the sub-flow 750.1. Moreover, the blocks 952, 976, and 956 are considered analogous blocks with respect to the blocks 752, 776, and 765, respectively. Therefore, the functionality of the blocks 902, 914, and 916 may be the same as or substantially similar to that previously described with respect to blocks 752, 776, and 765, respectively. For purposes of brevity, only differences between these functional blocks are discussed in further detail.

The sub-flow 750.1 provides various criteria that define the acceptance of a secured message, as discussed above with respect to Section I. For the process flow 950, two paths are shown, with upper path being identified with a challenging node receiving a response, and the lower path being identified with a responding node receiving a challenge request. It is noted that both of these paths may be executed by the same node at the same time, for example when a node receives other challenge requests and verifies responses to its own challenge requests.

In any event, the process flow 950 modifies the criteria by which a node may accept (block 976) secured messages based upon a determination (block 954) of whether a responding node indicates it is currently online, which may be in response to a previously issued request by a challenging node for online verification. Thus, the determination (block 954) may be performed via hardware or software, as noted above, and may determine for example whether a node has affirmatively responded to a previous request by setting a predetermined bit in the response field 804. Thus, if the online status request is not verified (block 954, no), then the secured message is rejected. Otherwise, the secured message is accepted (block 976). In either case, the process flow 950 may include updating (block 958) the online status log. Again, this may include, for instance, the challenging node updating the online status log 209, as discussed in this Section.

It is also noted that the determination (block 954) of whether a node is online may include determining the online status of a node within an acceptance window, which may correspond to any suitable threshold time period. For example, the acceptance (block 976) of secured messages may be conditioned upon whether the online status was confirmed (block 954, Yes) recently enough, even when a particular secured message does not contain a response. Such a determination may be included as part of the online determination as shown in block 954. As an illustrative example, a challenging node may not transmit secured messages very frequently, so additional secured messages occurring prior to a previous challenge request being sent may not include a response to an immediately outstanding challenge.

The process flow 950 may additionally or alternatively include, upon accepting (block 976) the secured message, a further determination (block 960) of whether the secured message includes an online verification request (i.e. a challenge request). This determination (block 960) may include, for example, identifying a representation of a query value contained in the secured message, such as the RSVP field 802 for instance, as noted herein. If not, then the process flow 950 follows the same path as noted above to update (block 958) the online status log (if necessary), and repeating this process for subsequently received secured messages.

However, if the secured message includes an online verification request, then the process flow 950 includes updating (block 962) the online verification request log, as noted above with respect to the online verification request log 207. The process flow 950 may then proceed to block 914 as shown and discussed above with respect to process flow 900. In this case, a secured message may be generated by, for example, populating the RESP field 804 with the contents of the online verification request log 207. Of course, the secured message that is generated in this manner may also contain a challenge request from other nodes via the representation of the query value, as noted herein.

EXAMPLES

The techniques of this disclosure may also be described in the following examples.

Example 1. A first node in a system of interconnected nodes configured to communicate over a bus, the first node comprising: processing circuitry configured to: derive a temporary session key from a shared secret and a counter value in accordance with a cryptographic function; and generate a secured message using the temporary session key, wherein the secured message includes a first field comprising a representation of the counter value, and a second field comprising a representation of a query value that indicates whether the first node is requesting an online status verification from one or more other nodes within the system of interconnected nodes; and communication circuitry configured to transmit the secured message to the bus.

Example 2. The first node of Example 1, wherein the processing circuitry is configured to determine whether a second node in the system of interconnected nodes is online based upon a received secured message that is received via the bus, the received secured message comprising a response to an online status verification sent over the bus by the first node.

Example 3. The first node of any combination of Examples 1-2, wherein the processing circuitry is configured to accept the received secured message based upon the response to the online status verification sent over the bus.

Example 4. The first node of any combination of Examples 1-3, wherein the response to the online status verification is represented by a third field contained in the received secured message that indicates an online status of the second node.

Example 5. The first node of any combination of Examples 1-4, wherein the processing circuitry is configured to store an indication of a determined online status of the plurality of nodes based upon the received secured message.

Example 6. The first node of any combination of Examples 1-5, wherein the third field comprises a bit string, and wherein the processing circuitry is configured to determine whether the second node is online by determining, for the received secured message, whether a bit in the bit string having a predetermined bit position identified with the first node indicates that the first node had requested online status verification.

Example 7. The first node of any combination of Examples 1-6, wherein the representation of the query value comprises a one-bit binary value or an encoded value that uniquely identifies the first node.

Example 8. The first node of any combination of Examples 1-7, wherein the representation of the counter value in the secured message enables one or more other nodes in the system of interconnected nodes to derive the temporary session key.

Example 9. The first node of any combination of Examples 1-8, wherein the system of interconnected nodes are configured to communicate over the bus in accordance with a multi-drop scheme.

Example 10. The first node any combination of Examples 1-9, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 11. The first node of any combination of Examples 1-10, wherein the secured message forms at least part of a communication protocol frame, and wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

Example 12. A first node in a system of interconnected nodes configured to communicate over a bus, the first node comprising: communication circuitry configured to receive a secured message via the bus, wherein the secured message includes (i) a first field comprising a representation of a counter value that was used to derive a temporary session key for generating the secured message in accordance with a cryptographic function prior to the secured message being received, and (ii) a second field containing an encoded value that indicates whether a second node affirmatively responded to an online status verification request from the first node; and processing circuitry configured to: determine a validity of the counter value that is computed from the representation of the counter value contained in the first field; and accept or reject the secured message based upon (i) the determined validity of the counter value, and (ii) a determination, based upon the encoded value in the second field, of whether the second node affirmatively responded to the online status verification request.

Example 13. The first node of Example 12, wherein: the second field comprises a bit string including a plurality of bits, a predetermined bit position of each one of the plurality of bits is identified with a respective node from among the system of interconnected nodes, and the encoded value in the second field corresponds to a predetermined bit position identified with the first node.

Example 14. The first node of any combination of Examples 12-13, wherein the previously-transmitted secured message includes a third field comprising a representation of a query value that indicates whether the first node is requesting an online status verification from the second node.

Example 15. The first node of any combination of Examples 12-14, wherein the representation of the query value comprises a one-bit binary value or an encoded value that uniquely identifies the first node.

Example 16. The first node of any combination of Examples 12-15, wherein the system of interconnected nodes are configured to communicate over the bus in accordance with a multi-drop scheme.

Example 17. The first node of any combination of Examples 12-16, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 18. The first node of any combination of Examples 12-17, wherein the secured message forms at least part of a communication protocol frame, and wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

Example 19. A first node in a system of interconnected nodes configured to communicate over a bus, the first node comprising: communication circuitry configured to receive a secured message via the bus, wherein the secured message includes (i) a first field comprising a representation of a counter value that was used to derive a temporary session key for generating the secured message in accordance with a cryptographic function prior to the secured message being received, and (ii) a second field comprising a representation of a query value that indicates a request for online status verification; and processing circuitry configured to: determine a validity of the counter value that is computed from the representation of the counter value contained in the first field; and accept or reject the secured message based upon the determined validity of the counter value; and wherein the communication circuitry is further configured, when the secured message is accepted, to generate a next scheduled secured message for transmission to the bus that includes a third field containing an encoded value that indicates an affirmative response to the online status verification request.

Example 20. The first node of Example 19, wherein: the third field comprises a bit string including a plurality of bits, and wherein each bit in the bit string is identified with each respective node of the system of interconnected nodes by way of a respective predetermined bit position within the bit string.

Example 21. The first node of any combination of Examples 19-20, wherein the processing circuitry is configured to store a local bit string comprising an indication, for each respective bit in the bit string, of whether each node in the system of interconnected nodes has requested an online status verification from the first node.

Example 22. The first node of any combination of Examples 19-21, wherein the communication circuitry is configured to transmit the next scheduled secured message to the bus comprising, as the bit string included in the third field, the local bit string.

Example 23. The first node of any combination of Examples 19-22, wherein the processing circuitry is configured to reset a value of each bit in the local bit string to a predetermined initial value after transmitting the next scheduled secured message.

Example 24. The first node of any combination of Examples 19-23, wherein the representation of the query value comprises a one-bit binary value or an encoded value that uniquely identifies the second node.

Example 25. The first node of any combination of Examples 19-24, wherein the system of interconnected nodes are configured to communicate over the bus in accordance with a multi-drop scheme.

Example 26. The first node of any combination of Examples 19-25, wherein the communication circuitry is configured to transmit the next scheduled secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 27. The first node of any combination of Examples 19-26, wherein the secured message and the next scheduled secured message form at least part of a communication protocol frame, and wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

Example 28. A node in a system of interconnected nodes that form part of a secured control system and are configured to communicate over a bus, comprising: processing circuitry configured to: generate a secured message using a temporary session key, wherein the secured message includes (i) a first field comprising a representation of a query value that indicates whether the node is requesting an online status verification from other nodes within the system of interconnected nodes, and (ii) a second field that indicates whether the node has affirmatively responded to an online status verification request from any node from among the system of interconnected nodes, and store an indication of a current online status of each node in the system of interconnected nodes; and communication circuitry configured to transmit the secured message to the bus.

Example 29. The node of Example 28, wherein the stored indication of the current online status of each node in the system of interconnected nodes comprises a bit string, and wherein a value of each bit in the bit string indicates whether each node in the system of interconnected nodes is currently online.

Example 30. The node of any combination of Examples 28-29, wherein the processing circuitry is configured to determine the current online status of each node in the system of interconnected nodes based upon an accumulation of bit values from a plurality of received secured messages.

Example 31. The node of any combination of Examples 28-30, wherein the bit value of each bit in the bit string is reset to a predetermined value after expiration of a threshold time period.

Example 32. The node of any combination of Examples 28-31, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 33. A method for transmitting a secured message via a node in a system of interconnected nodes configured to communicate over a bus, the method comprising: deriving a temporary session key from a shared secret and a counter value in accordance with a cryptographic function; generating a secured message using the temporary session key, wherein the secured message includes a first field comprising a representation of the counter value, and a second field comprising a representation of a query value that indicates whether the node is requesting an online status verification from one or more other nodes within the system of interconnected nodes; and transmitting the secured message to the bus.

Example 34. The method of Example 33, wherein transmitting the secured message comprises: transmitting the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 35. A method for receiving a secured message via a first node in a system of interconnected nodes configured to communicate over a bus, the method comprising: receiving a secured message via the bus, wherein the secured message includes (i) a first field comprising a representation of a counter value that was used to derive a temporary session key for generating the secured message in accordance with a cryptographic function prior to the secured message being received, and (ii) a second field containing an encoded value that indicates whether a second node affirmatively responded to an online status verification request from the first node; determining a validity of the counter value that is computed from the representation of the counter value contained in the first field; and accepting or rejecting the secured message based upon (i) the determined validity of the counter value, and (ii) a determination, based upon the encoded value in the second field, of whether the second node affirmatively responded to the online status verification request.

Example 36. The method of Example 35, wherein receiving the secured message comprises: receiving the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 37. A method for communicating via a first node in a system of interconnected nodes configured to communicate over a bus, the method comprising: receiving a secured message via the bus, wherein the secured message includes (i) a first field comprising a representation of a counter value that was used to derive a temporary session key for generating the secured message in accordance with a cryptographic function prior to the secured message being received, and (ii) a second field comprising a representation of a query value that indicates a request for online status verification, determining a validity of the counter value that is computed from the representation of the counter value contained in the first field; accepting or rejecting the secured message based upon the determined validity of the counter value; and when the first secured message is accepted, generating a next scheduled secured message for transmission to the bus that includes a third field containing an encoded value that indicates an affirmative response to the online status verification request.

Example 38. The method of Example 37, wherein receiving the first secured message comprises: receiving the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol, and wherein transmitting the second secured message comprises:

transmitting the next scheduled secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

Example 39. A method for communicating via a node in a system of interconnected nodes that form part of a secured control system and are configured to communicate over a bus, the method comprising: generating a secured message using a temporary session key, wherein the secured message includes (i) a first field comprising a representation of a query value that indicates whether the node is requesting an online status verification from other nodes within the system of interconnected nodes, and (ii) a second field that indicates whether the node has affirmatively responded to an online status verification request from any node within the system of interconnected nodes, storing an indication of a current online status of each node in the system of interconnected nodes; and transmitting the secured message to the bus.

Example 40. The method of Example 39, wherein transmitting the secured message comprises: transmitting the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A first node in a system of interconnected nodes configured to communicate over a bus, the first node comprising:
processing circuitry configured to:
derive a temporary session key from a shared secret and a counter value in accordance with a cryptographic function;
generate a secured message using the temporary session key,
wherein the secured message includes a first field comprising a representation of the counter value, and a second field comprising a representation of a query value that indicates whether the first node is requesting an online status verification from one or more other nodes within the system of interconnected nodes; and
determine whether a second node in the system of interconnected nodes is online based upon a received secured message that is received via the bus, the received secured message comprising a response to an online status verification sent over the bus by the first node; and
communication circuitry configured to transmit the secured message to the bus,
wherein the response to the online status verification is represented by a third field contained in the received secured message that indicates an online status of the second node.

2. The first node of claim 1, wherein the processing circuitry is configured to accept the received secured message based upon the response to the online status verification sent over the bus.

3. The first node of claim 1, wherein the processing circuitry is configured to store an indication of a determined online status of the second node based upon the received secured message.

4. The first node of claim 1, wherein the third field comprises a bit string, and
wherein the processing circuitry is configured to determine whether the second node is online by determining, for the received secured message, whether a bit in the bit string having a predetermined bit position identified with the first node indicates that the first node had requested online status verification.

5. The first node of claim 1, wherein the representation of the query value comprises a one-bit binary value or an encoded value that uniquely identifies the first node.

6. The first node of claim 1, wherein the representation of the counter value in the secured message enables the one or more other nodes in the system of interconnected nodes to derive the temporary session key.

7. The first node of claim 1, wherein the system of interconnected nodes are configured to communicate over the bus in accordance with a multi-drop scheme.

8. The first node of claim 1, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

9. The first node of claim 1, wherein the secured message forms at least part of a communication protocol frame, and
wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

10. A first node in a system of interconnected nodes configured to communicate over a bus, the first node comprising:
communication circuitry configured to receive a secured message via the bus,
wherein the secured message includes (i) a first field comprising a representation of a counter value that was used to derive a temporary session key for generating the secured message in accordance with a cryptographic function prior to the secured message being received, and (ii) a second field containing an encoded value that indicates whether a second node affirmatively responded to an online status verification request from the first node; and
processing circuitry configured to:
determine a validity of the counter value that is computed from the representation of the counter value contained in the first field; and
accept or reject the secured message based upon (i) the determined validity of the counter value, and (ii) a determination, based upon the encoded value in the second field, of whether the second node affirmatively responded to the online status verification request,
wherein:
the second field comprises a bit string including a plurality of bits,
a predetermined bit position of each one of the plurality of bits is identified with a respective node from among the system of interconnected nodes, and
the encoded value in the second field corresponds to a predetermined bit position identified with the first node.

11. The first node of claim 10, wherein a previously-transmitted secured message by the first node includes a third field comprising a representation of a query value that indicates whether the first node is requesting an online status verification from the second node.

12. The first node of claim 11, wherein the representation of the query value comprises a one-bit binary value or an encoded value that uniquely identifies the first node.

13. The first node of claim 10, wherein the system of interconnected nodes are configured to communicate over the bus in accordance with a multi-drop scheme.

14. The first node of claim 10, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

15. The first node of claim 10, wherein the secured message forms at least part of a communication protocol frame, and wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

16. A first node in a system of interconnected nodes configured to communicate over a bus, the first node comprising:
communication circuitry configured to receive a secured message via the bus,
wherein the secured message includes (i) a first field comprising a representation of a counter value that was used to derive a temporary session key for generating the secured message in accordance with a cryptographic function prior to the secured message being received, and (ii) a second field comprising a representation of a query value that indicates a request for online status verification; and
processing circuitry configured to:
determine a validity of the counter value that is computed from the representation of the counter value contained in the first field; and
accept or reject the secured message based upon the determined validity of the counter value, wherein:
the communication circuitry is further configured, when the secured message is accepted, to generate a next scheduled secured message for transmission to the bus that includes a third field containing an encoded value that indicates an affirmative response to the online status verification request,
the third field comprises a bit string including a plurality of bits, and
each bit in the bit string is identified with each respective node of the system of interconnected nodes by way of a respective predetermined bit position within the bit string.

17. The first node of claim 16, wherein the processing circuitry is configured to store a local bit string comprising an indication, for each respective bit in the bit string, of whether each node in the system of interconnected nodes has requested an online status verification from the first node.

18. The first node of claim 17, wherein the communication circuitry is configured to transmit the next scheduled secured message to the bus comprising, as the bit string included in the third field, the local bit string.

19. The first node of claim 18, wherein the processing circuitry is configured to reset a value of each bit in the local bit string to a predetermined initial value after transmitting the next scheduled secured message.

20. The first node of claim 16, wherein the representation of the query value comprises a one-bit binary value or an encoded value that uniquely identifies a second node in the system of interconnected nodes.

21. The first node of claim 16, wherein the system of interconnected nodes are configured to communicate over the bus in accordance with a multi-drop scheme.

22. The first node of claim 16, wherein the communication circuitry is configured to transmit the next scheduled secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

23. The first node of claim 16, wherein the secured message and the next scheduled secured message form at least part of a communication protocol frame, and wherein the communication protocol frame comprises one of a Controller Area Network (CAN) communication protocol frame, a Controller Area Network Flexible Data-Rate (CAN FD) communication protocol frame, a Controller Area Network Extra Long (CAN XL) communication protocol frame, or an Ethernet communication protocol frame.

24. A node in a system of interconnected nodes that form part of a secured control system and are configured to communicate over a bus, comprising:
processing circuitry configured to:
generate a secured message using a temporary session key,
wherein the secured message includes (i) a first field comprising a representation of a query value that indicates whether the node is requesting an online status verification from other nodes within the system of interconnected nodes, and (ii) a second field that indicates whether the node has affirmatively responded to an online status verification request from any node from among the system of interconnected nodes, and
store an indication of a current online status of each node in the system of interconnected nodes; and
communication circuitry configured to transmit the secured message to the bus,
wherein the stored indication of the current online status of each node in the system of interconnected nodes comprises a bit string, and
wherein a value of each bit in the bit string indicates whether each node in the system of interconnected nodes is currently online.

25. The node of claim 24, wherein the processing circuitry is configured to determine the current online status of each node in the system of interconnected nodes based upon an accumulation of bit values from a plurality of received secured messages.

26. The node of claim 24, wherein the bit value of each bit in the bit string is reset to a predetermined value after expiration of a threshold time period.

27. The node of claim 24, wherein the communication circuitry is configured to transmit the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

28. A method for transmitting a secured message via a first node in a system of interconnected nodes configured to communicate over a bus, the method comprising:
deriving a temporary session key from a shared secret and a counter value in accordance with a cryptographic function;
generating a secured message using the temporary session key,
wherein the secured message includes a first field comprising a representation of the counter value, and a second field comprising a representation of a query value that indicates whether the first node is requesting an online status verification from one or more other nodes within the system of interconnected nodes;
determining whether a second node in the system of interconnected nodes is online based upon a received secured message that is received via the bus, the received secured message comprising a response to an online status verification sent over the bus by the first node; and transmitting the secured message to the bus, wherein the response to the online status verification is represented by a third field contained in the received secured message that indicates an online status of the second node.

29. The method of claim 28, wherein transmitting the secured message comprises:

transmitting the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

30. A method for receiving a secured message via a first node in a system of interconnected nodes configured to communicate over a bus, the method comprising:

receiving a secured message via the bus, wherein the secured message includes (i) a first field comprising a representation of a counter value that was used to derive a temporary session key for generating the secured message in accordance with a cryptographic function prior to the secured message being received, and (ii) a second field containing an encoded value that indicates whether a second node affirmatively responded to an online status verification request from the first node;

determining a validity of the counter value that is computed from the representation of the counter value contained in the first field; and accepting or rejecting the secured message based upon (i) the determined validity of the counter value, and (ii) a determination, based upon the encoded value in the second field, of whether the second node affirmatively responded to the online status verification request, wherein:
the second field comprises a bit string including a plurality of bits,
a predetermined bit position of each one of the plurality of bits is identified with a respective node from among the system of interconnected nodes, and
the encoded value in the second field corresponds to a predetermined bit position identified with the first node.

31. The method of claim 30, wherein receiving the secured message comprises: receiving the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

32. A method for communicating via a first node in a system of interconnected nodes configured to communicate over a bus, the method comprising:

receiving a secured message via the bus, wherein the secured message includes (i) a first field comprising a representation of a counter value that was used to derive a temporary session key for generating the secured message in accordance with a cryptographic function prior to the secured message being received, and (ii) a second field comprising a representation of a query value that indicates a request for online status verification, determining a validity of the counter value that is computed from the representation of the counter value contained in the first field;

accepting the secured message based upon the determined validity of the counter value; and generating a next scheduled secured message for transmission to the bus that includes a third field containing an encoded value that indicates an affirmative response to the online status verification request, wherein the third field comprises a bit string including a plurality of bits, and wherein each bit in the bit string is identified with each respective node of the system of interconnected nodes by way of a respective predetermined bit position within the bit string.

33. The method of claim 32, wherein receiving the secured message comprises:

receiving the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

34. A method for communicating via a node in a system of interconnected nodes that form part of a secured control system and are configured to communicate over a bus, the method comprising:

generating a secured message using a temporary session key, wherein the secured message includes (i) a first field comprising a representation of a query value that indicates whether the node is requesting an online status verification from other nodes within the system of interconnected nodes, and (ii) a second field that indicates whether the node has affirmatively responded to an online status verification request from any node within the system of interconnected nodes, storing an indication of a current online status of each node in the system of interconnected nodes; and transmitting the secured message to the bus, wherein the stored indication of the current online status of each node in the system of interconnected nodes comprises a bit string, and wherein a value of each bit in the bit string indicates whether each node in the system of interconnected nodes is currently online.

35. The method of claim 34, wherein transmitting the secured message comprises: transmitting the secured message in accordance with a communication protocol comprising one of a Controller Area Network (CAN) communication protocol, a Controller Area Network Flexible Data-Rate (CAN FD) communication protocol, a Controller Area Network Extra Long (CAN XL) communication protocol, or a multi-drop Ethernet communication protocol.

* * * * *